(12) United States Patent
Asano

(10) Patent No.: US 7,925,115 B2
(45) Date of Patent: Apr. 12, 2011

(54) IMAGE PROCESSING DEVICE CAPABLE OF DETECTING AND CORRECTING INCLINATION OF IMAGE

(75) Inventor: Motohiro Asano, Osaka (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1269 days.

(21) Appl. No.: 11/350,060

(22) Filed: Feb. 8, 2006

(65) Prior Publication Data
US 2006/0181564 A1 Aug. 17, 2006

(30) Foreign Application Priority Data

Feb. 14, 2005 (JP) .................................. 2005-36399

(51) Int. Cl.
*G06K 9/36* (2006.01)
(52) U.S. Cl. ......... 382/289; 382/294; 382/296; 382/297
(58) Field of Classification Search .................. 382/289
See application file for complete search history.

(56) References Cited

U.S. PATENT DOCUMENTS

| | | | | | |
|---|---|---|---|---|---|
| 4,736,448 | A * | 4/1988 | Umemura | ...................... | 382/260 |
| 5,351,315 | A * | 9/1994 | Ueda et al. | ...................... | 382/266 |
| 5,650,858 | A * | 7/1997 | Lund | ............................ | 358/3.15 |
| 5,668,898 | A * | 9/1997 | Tatsuta | .......................... | 382/290 |
| 5,818,976 | A * | 10/1998 | Pasco et al. | .................... | 382/289 |
| 6,310,984 | B2 * | 10/2001 | Sansom-Wai et al. | ........ | 382/289 |
| 6,415,964 | B2 * | 7/2002 | Woods | ..................... | 222/402.25 |
| 6,683,983 | B1 * | 1/2004 | Shen et al. | ..................... | 382/168 |
| 7,065,261 | B1 * | 6/2006 | Horie | .............................. | 382/289 |
| 7,200,285 | B2 * | 4/2007 | Li et al. | .......................... | 382/289 |
| 2003/0113021 | A1 * | 6/2003 | Shiotani | ........................ | 382/209 |
| 2005/0141037 | A1 * | 6/2005 | Shin | ............................... | 358/3.15 |

FOREIGN PATENT DOCUMENTS

| | | | |
|---|---|---|---|
| JP | 3-144863 A | | 6/1991 |
| JP | 03144863 | * | 6/1991 |
| JP | 10-206134 A | | 8/1998 |
| JP | 10206134 | * | 8/1998 |
| JP | 2000-190569 A | | 7/2000 |
| JP | 2002-133422 A | | 5/2002 |
| JP | 2002133422 | * | 5/2002 |
| JP | 2004-128845 A | | 4/2004 |
| JP | 204128845 | * | 4/2004 |
| JP | 2004128845 | * | 4/2004 |

OTHER PUBLICATIONS

Japanese "Notice of Grounds of Rejection" dated Dec. 1, 2009, for counterpart Japanese Patent Application No. 2005-036399, together with an English-language translation thereof.

(Continued)

*Primary Examiner* — Samir A Ahmed
*Assistant Examiner* — Jayesh Patel
(74) *Attorney, Agent, or Firm* — Sidley Austin LLP

(57) ABSTRACT

An image process capable of rapidly detecting and correcting the inclination of a document image is executed as follows. Dots are put on a document image at even intervals and the document image is printed to provide a printed object. The printed object is read with a scanner to provide image data. Processes are performed on the image data with a plurality of filters for detecting dots corresponding to a plurality of inclinations to calculate the degrees of agreement between the data and the filters. The inclination angle of a filter exhibiting a highest degree of agreement is set to the inclination angle.

16 Claims, 33 Drawing Sheets

OTHER PUBLICATIONS

Japanese "Notice of Grounds for Rejection", dated Feb. 23, 2010, for the corresponding Japanese Patent Application No. 2005-036399, together with an English-language translation thereof.

Japanese Official Communication dated Jun. 22, 2010, for counterpart Japanese Patent Application No. 2005-036399, together with an English-language translation thereof.

* cited by examiner

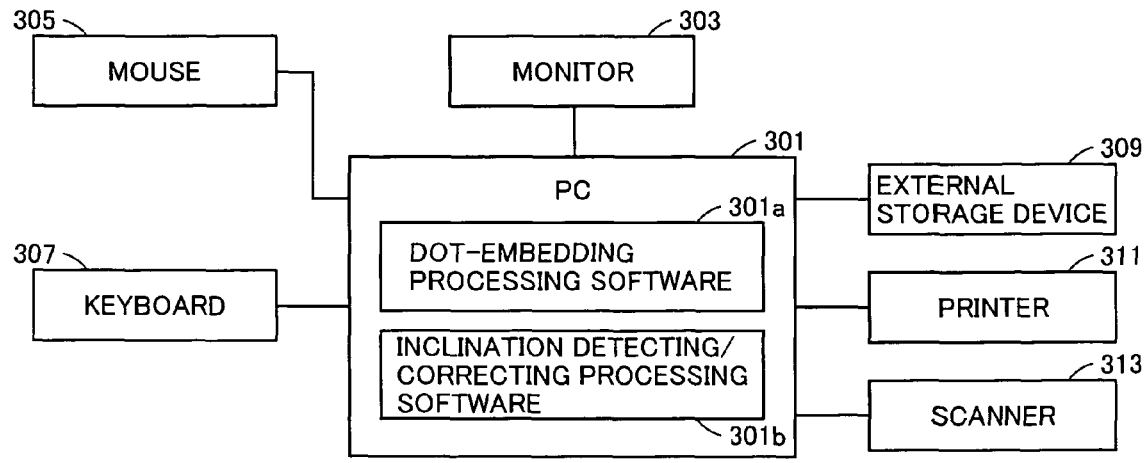
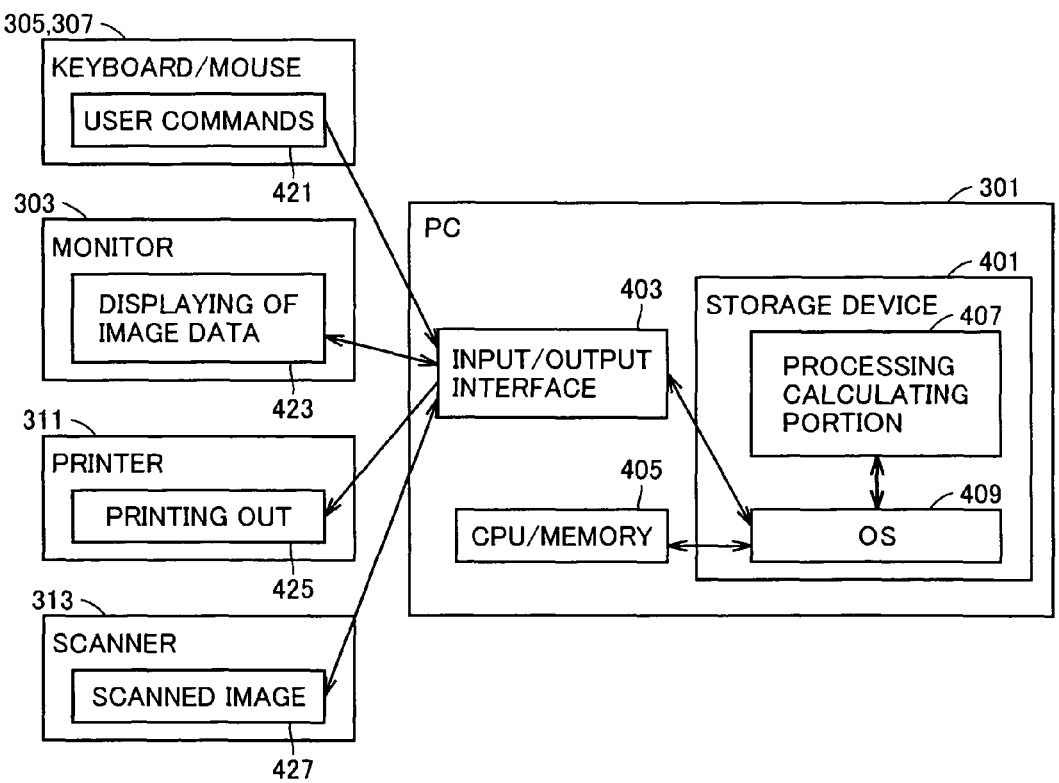

(FILTER A1)

(FILTER A2)

(FILTER A3)

(FILTER A4)

(FILTER A5)

(FILTER A6)

(FILTER A7)

(FILTER A8)

(FILTER A9)

(FILTER A10)

(FILTER A11)

(FILTER A12)

(FILTER A13)

FIG.23

| FILTER | DEGREE OF INCLINATION AGREEMENT | HIGHEST DEGREE OF INCLINATION AGREEMENT | X POSITION OF GRAY PIXEL | Y POSITION OF GRAY PIXEL | INCLINATION ANGLE | |
|---|---|---|---|---|---|---|
| A7 | 3023888 | | 5 | -6 | -50.2 | $=\tan^{-1}(-6/5)$ |
| A6 | 3032432 | | 6 | -5 | -39.8 | $=\tan^{-1}(-5/6)$ |
| A5 | 3115960 | | 7 | -4 | -29.7 | $=\tan^{-1}(-4/7)$ |
| A4 | 3262919 | | 7 | -3 | -23.2 | $=\tan^{-1}(-3/7)$ |
| A3 | 3636618 | | 8 | -2 | -14.0 | $=\tan^{-1}(-2/8)$ |
| A2 | 3761035 | ○ | 8 | -1 | -7.13 | $=\tan^{-1}(-1/8)$ |
| A1 | 3480535 | | 8 | 0 | 0 | $=\tan^{-1}(0/8)$ |
| A8 | 3224342 | | 8 | 1 | 7.13 | $=\tan^{-1}(1/8)$ |
| A9 | 3088682 | | 8 | 2 | 14.0 | $=\tan^{-1}(2/8)$ |
| A10 | 3020477 | | 7 | 3 | 23.2 | $=\tan^{-1}(3/7)$ |
| A11 | 3033909 | | 7 | 4 | 29.7 | $=\tan^{-1}(4/7)$ |
| A12 | 2989534 | | 6 | 5 | 39.8 | $=\tan^{-1}(5/6)$ |
| A13 | 2969479 | | 5 | 6 | 50.2 | $=\tan^{-1}(6/5)$ |

(FILTER B1)

(FILTER B2)

(FILTER B3)

(FILTER B4)

(FILTER B5)

FIG.30

| FILTERS WITH 8-PIXEL INTERVALS | X POSITION OF GRAY PIXEL | Y POSITION OF GRAY PIXEL | INCLINATION ANGLE | |
|---|---|---|---|---|
| A3 | 8 | -2 | -14.0 | $=\tan^{-1}(-2/8)$ |
| A2 | 8 | -1 | -7.13 | $=\tan^{-1}(-1/8)$ |
| A1 | 8 | 0 | 0 | $=\tan^{-1}(0/8)$ |

| FILTERS WITH 16-PIXEL INTERVALS | X POSITION OF GRAY PIXEL | Y POSITION OF GRAY PIXEL | INCLINATION ANGLE | |
|---|---|---|---|---|
| B5 | 15 | -4 | -14.9 | $=\tan^{-1}(-4/15)$ |
| B4 | 16 | -3 | -10.6 | $=\tan^{-1}(-3/16)$ |
| B3 | 16 | -2 | -7.13 | $=\tan^{-1}(-2/16)$ |
| B2 | 16 | -1 | -3.58 | $=\tan^{-1}(-1/16)$ |
| B1 | 16 | 0 | 0 | $=\tan^{-1}(0/16)$ |

(FILTER C1)

(FILTER C2)

(FILTER C3)

NOISE DURING SCANNING (FILTER D1)

(FILTER D2)

PLACEMENT OF DOTS
DURING PRINTING

PLACEMENT OF DOTS
DURING SCANNING

FIG.43

| FILTER | X POSITION OF GRAY PIXEL | Y POSITION OF GRAY PIXEL | INCLINATION ANGLE | | sin | cos |
|---|---|---|---|---|---|---|
| A7 | 5 | -6 | -50.2 | =tan⁻¹(-6/5) | -6/8 | 5/8 |
| A6 | 6 | -5 | -39.8 | =tan⁻¹(-5/6) | -5/8 | 6/8 |
| A5 | 7 | -4 | -29.7 | =tan⁻¹(-4/7) | -4/8 | 7/8 |
| A4 | 7 | -3 | -23.2 | =tan⁻¹(-3/7) | -3/8 | 7/8 |
| A3 | 8 | -2 | -14.0 | =tan⁻¹(-2/8) | -2/8 | 8/8 |
| A2 | 8 | -1 | -7.13 | =tan⁻¹(-1/8) | -1/8 | 8/8 |
| A1 | 8 | 0 | 0 | =tan⁻¹(0/8) | 0/8 | 8/8 |
| A8 | 8 | 1 | 7.13 | =tan⁻¹(1/8) | 1/8 | 8/8 |
| A9 | 8 | 2 | 14.0 | =tan⁻¹(2/8) | 2/8 | 8/8 |
| A10 | 7 | 3 | 23.2 | =tan⁻¹(3/7) | 3/8 | 7/8 |
| A11 | 7 | 4 | 29.7 | =tan⁻¹(4/7) | 4/8 | 7/8 |
| A12 | 6 | 5 | 39.8 | =tan⁻¹(5/6) | 5/8 | 6/8 |
| A13 | 5 | 6 | 50.2 | =tan⁻¹(6/5) | 6/8 | 5/8 |

FIG.47
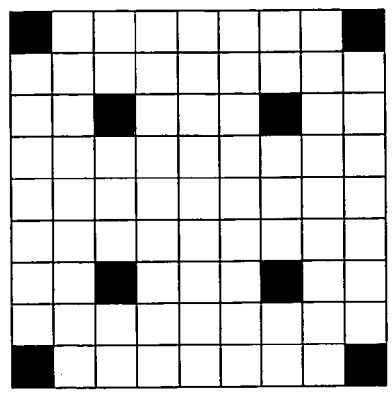
FIG.48
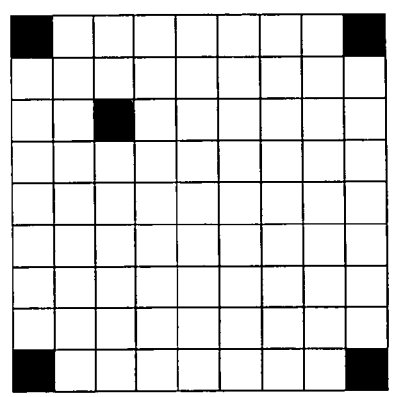
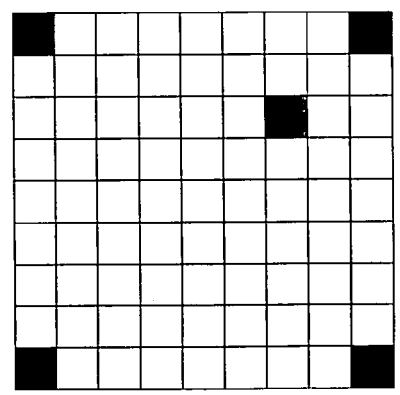
0°　　　　　　　　　　90°
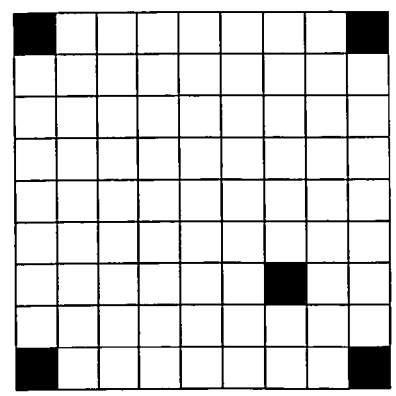
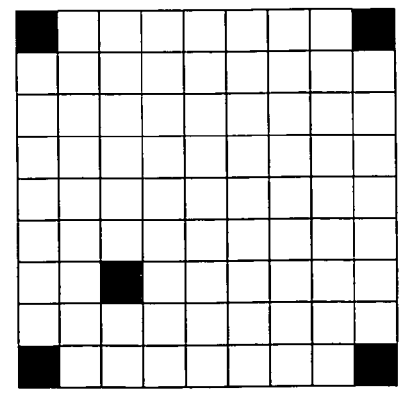
180°　　　　　　　　　270°

FIG.49

| FILTER | DEGREE OF INCLINATION AGREEMENT | HIGHEST DEGREE OF INCLINATION AGREEMENT | X POSITION OF GRAY PIXEL | Y POSITION OF GRAY PIXEL | INCLINATION ANGLE | | INCLINATION ANGLE (EXTENDED) | DETERMINATION |
|---|---|---|---|---|---|---|---|---|
| A7 | 3023888 | | 5 | -6 | -50.2 | =tan⁻¹(-6/5) | -52.7 | |
| | | | | | | | -47.6 | |
| A6 | 3032432 | | 6 | -5 | -39.8 | =tan⁻¹(-5/6) | -42.4 | |
| | | | | | | | -37.3 | |
| A5 | 3115960 | | 7 | -4 | -29.7 | =tan⁻¹(-4/7) | -32.2 | |
| | | | | | | | -28.1 | |
| A4 | 3262919 | | 7 | -3 | -23.2 | =tan⁻¹(-3/7) | -24.8 | |
| | | | | | | | -20.9 | |
| A3 | 3636618 | | 8 | -2 | -14.0 | =tan⁻¹(-2/8) | -16.3 | |
| | | | | | | | -12.3 | |
| A2 | 3761035 | O | 8 | -1 | -7.13 | =tan⁻¹(-1/8) | -8.85 | O |
| | | | | | | | -5.35 | |
| A1 | 3480535 | | 8 | 0 | 0 | =tan⁻¹(0/8) | -1.78 | |
| | | | | | | | 1.78 | |
| A8 | 3224342 | | 8 | 1 | 7.13 | =tan⁻¹(1/8) | 5.35 | |
| | | | | | | | 8.85 | |
| A9 | 3088682 | | 8 | 2 | 14.0 | =tan⁻¹(2/8) | 12.3 | |
| | | | | | | | 16.3 | |
| A10 | 3020477 | | 7 | 3 | 23.2 | =tan⁻¹(3/7) | 20.9 | |
| | | | | | | | 24.8 | |
| A11 | 3033909 | | 7 | 4 | 29.7 | =tan⁻¹(4/7) | 28.1 | |
| | | | | | | | 32.2 | |
| A12 | 2989534 | | 6 | 5 | 39.8 | =tan⁻¹(5/6) | 37.3 | |
| | | | | | | | 42.4 | |
| A13 | 2969479 | | 5 | 6 | 50.2 | =tan⁻¹(6/5) | 47.6 | |
| | | | | | | | 52.7 | |

IMAGE PROCESSING DEVICE CAPABLE OF DETECTING AND CORRECTING INCLINATION OF IMAGE

This application is based on Japanese Patent Application No. 2005-036399 filed with the Japan Patent Office on Feb. 14, 2005, the entire content of which is hereby incorporated by reference.

BACKGROUND OF THE INVENTION

1. Field of the Invention

The present invention relates to image processing devices, image processing methods and image processing programs. More particularly, the present invention relates to image processing devices, image processing methods and image processing programs capable of detecting and correcting the inclinations of images.

2. Description of the Related Art

In the field of image creating devices as typified by MFPs (Multi Function Peripherals) and laser beam printers, there have been developed "document electronic watermarking" techniques for embedding data as tint-block patterns on the backgrounds of document images.

In order to scan a printed-out object having data embedded therein as tint-block patterns and detect the data, there has been a need for addressing the inclination of the document during the scanning.

Japanese Laid-Open Patent Publication No. 2004-128845 discloses a method of detecting the inclinations of documents on the basis of the relationship among three types of dots embedded therein as electronic watermarks, as a technique relating to countermeasure to the inclinations of documents.

Further, Japanese Laid-Open Patent Publication No. 03-144863 discloses a document-image inclination detecting and correcting method which calculates integral values of a document image in a plurality of directions and detects a peak value of the integral values as the direction of inclination, wherein during the detection the testing angle is changed in two steps (the testing angle is smaller at first and then widened) to enable rapid detection of the inclination.

SUMMARY OF THE INVENTION

It is an object of the present invention to provide image processing devices, image processing methods and image processing programs capable of rapidly detecting and correcting the inclinations of images.

According to one aspect of the present invention, in order to attain the aforementioned object, an image processing device includes: an inputting portion which inputs image data obtained by reading a printed object having dots put thereon at least in a single direction; a first processor which processes the input image data with a first filter for detecting that the dots are arranged at a first inclination angle; a second processor which processes the input image data with a second filter for detecting that the dots are arranged at a second inclination angle; and a detector which detects the inclination angle of the image, on the basis of the image data obtained from the first and second processors.

According to another aspect of the present invention, an image processing device includes: an inputting portion which inputs image data which is obtained by reading a printed object having dots put thereon at least in a single direction; a determining portion which determines the relative positional relationship between at least two dots, from the input image data; an approximating portion which approximates the inclination angle of the image to an integer ratio, on the basis of the result of determination of the determining portion; and a corrector which corrects the inclination of the image, by using the approximate integer ratio.

According to the one aspect of the present invention, it is possible to input image data obtained by reading a printed object having dots put thereon at least in a single direction, process the input image data with filters for detecting that the dots are arranged at predetermined inclination angles and detect the inclination angle of the image, on the basis of the obtained image data, which enables providing image processing devices, image processing methods and image processing programs capable of rapidly detecting the inclinations of images.

According to the another aspect of the present invention, it is possible to input image data obtained by reading a printed object having dots put thereon at least in a single direction, determine the relative positional relationship between at least two dots, approximate the inclination angle of the image to an integer ratio, on the basis of the result of determination and correct the inclination of the image using the approximate integer ratio, which enables providing image processing devices, image processing methods and image processing programs capable of rapidly correcting the inclinations of images.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram illustrating the structure of an image processing device according to a first embodiment of the present invention;

FIG. 2 illustrates, in more detail, the inside of a PC 301 of FIG. 1;

FIG. 23 illustrates the result of the application of filtering processes A1 to A13 to the image of FIG. 7;

FIG. 30 illustrates the correspondence between filters A and filters B;

FIG. 43 illustrates approximated sin and cos values with respect to filters A1 to A13;

FIG. 47 illustrates a filter employed in the sixth embodiment;

FIG. 48 illustrates a process for determining the rotation of an image according to the sixth embodiment;

FIG. 49 illustrates a process for determining the inclination angle according to a seventh embodiment;

DESCRIPTION OF THE PREFERRED EMBODIMENTS

First Embodiment

Figure 3:
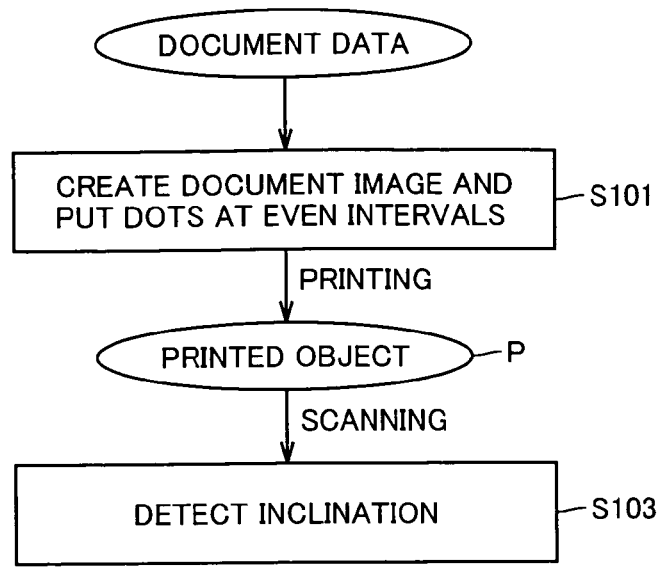
FIG. 3 is a flowchart illustrating a process which is executed by dot-embedding processing software 301a and inclination detecting/correcting software 301b of the image processing device of FIG. 1.

FIG. 1 is a block diagram illustrating the structure of an image processing device according to a first embodiment of the present invention.

Referring to the figure, the image processing device is constituted by a PC (Personal Computer) 301, a monitor 303 which operates as a display device, a mouse 305 and a keyboard 307 which operate as user input devices, an external storage device 309 which stores data and programs, a printer 311 which outputs images and the like, and a scanner 313 which reads images from documents.

Dot-embedding processing software 301a and inclination detecting/correcting processing software 301b are recorded in a memory in PC 301, and the computer operates in accordance with these software (programs).

FIG. 2 illustrates, in more detail, the inside of PC 301 of FIG. 1.

Referring to the figure, PC 301 includes, inside thereof, an input/output interface 403, a CPU and a memory 405 and a storage device 401.

Storage device 401 includes an OS (Operating System) 409 and a calculation processor 407. A portion of storage device 401 may be an external storage device.

User commands 421 from keyboard 307 and mouse 305 and scanned images 427 from scanner 313 are input to PC 301 through input/output interface 403. Data is transmitted from PC 301 through input/output interface 403 to monitor 303 or printer 311 so that displaying of image data 423 and printing out 425 are executed therein.

When the image processing device is used for printout, dots are printed at even intervals in a single direction (or two directions), as data for inclination detection. When the scanner reads the printed object, the inclination thereof is detected on the basis of the dots and the inclination is corrected as required.

FIG. 3 is a flowchart illustrating a process which is executed by dot-embedding processing software 301a and inclination detecting/correcting software 301b of the image processing device of FIG. 1.

Referring to the figure, in step S101, a document image is created and predetermined dots are put on the image data at even intervals, before the document image is printed out. Then, the image data is printed out to provide a printed object P having dots printed thereon.

In step S103, printed object S is scanned with scanner 313, and the inclination of the printed object (and the image data acquired by the scanning) is detected, on the basis of the scanned image.

Figure 4:
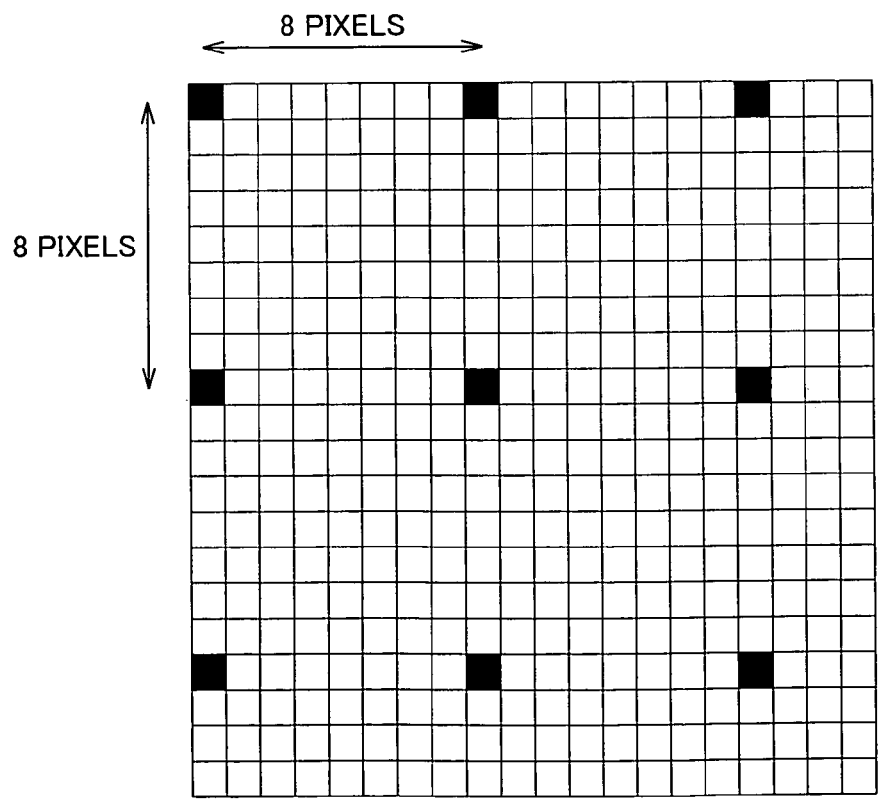
FIG. 4 illustrates exemplary dots embedded in image data.

FIG. 4 illustrates exemplary dots embedded in image data.

Referring to the figure, dots are put at 8-pixel intervals in the lateral direction (dots can be put at arbitrary intervals in the vertical direction and, in this case, dots are put at 8-pixel intervals).

Figure 5:
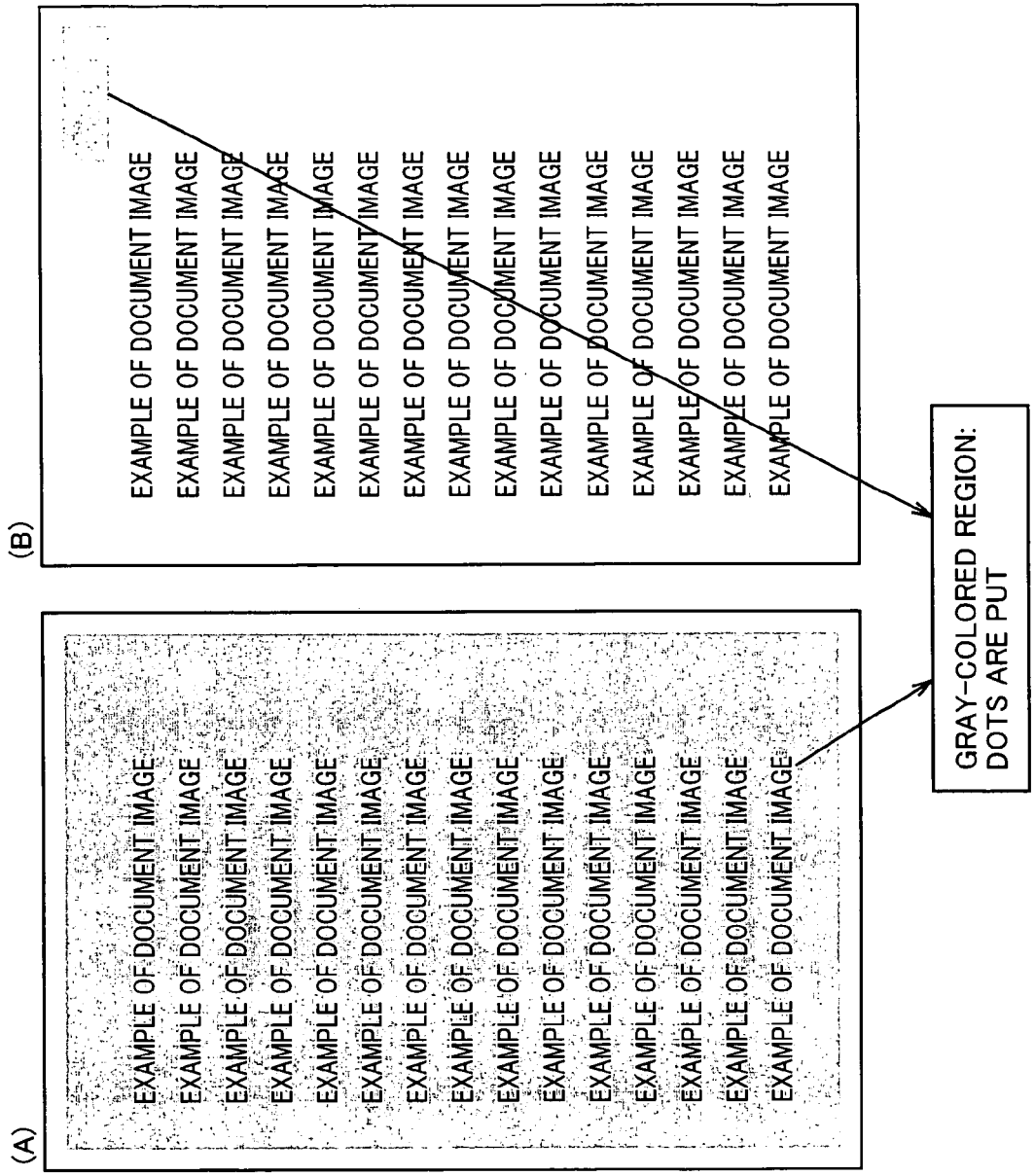
FIG. 5 illustrates concrete exemplary printed objects having the dots of FIG. 4 embedded therein.

FIG. 5 illustrates concrete exemplary printed objects having dots embedded therein.

When dots as illustrated in FIG. 4 are printed out by, for example, a printer of 600 dpi, the dots are printed at small intervals such as at 8/600 inch (about 0.32 mm) intervals. Accordingly, the regions over which dots are put seem like a gray color as illustrated in FIG. 5.

While dots are printed over the entire surface of a printed document herein as illustrated in (A) of FIG. 5, dots may be printed at a portion of a printed document as illustrated in (B) of FIG. 5.

Next, the inclination detecting process (step S103 of FIG. 3) will be described in detail.

Figure 6:
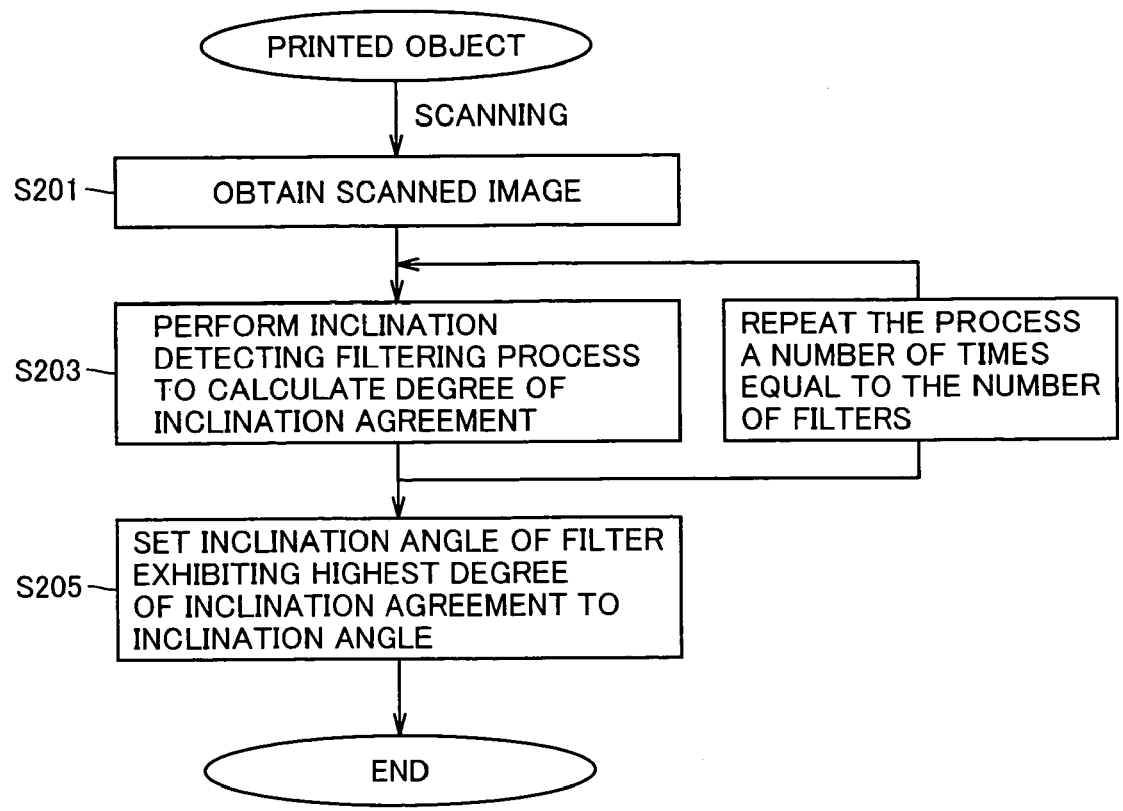
FIG. 6 is a flowchart illustrating the detail of the inclination detecting process (step S103 of FIG. 3)

FIG. 6 is a flowchart illustrating the detail of the inclination detecting process (step S103 of FIG. 3).

In step S201, the printed object illustrated in FIG. 5 is scanned by scanner 313 to provide a scanned image. In step S203, the scanned image is subjected to an inclination-detecting filtering process to calculate the degree of inclination agreement. The process in step S203 is repeatedly performed a number of times equal to the number of filters.

In step S205, the inclination angle defined by a filter which exhibits a highest degree of inclination agreement with the scanned image is set to the inclination angle of the printed object.

Figure 7:
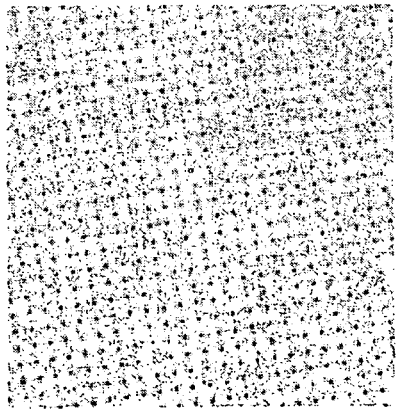
FIG. 7 illustrates a concrete example of the scanned image obtained in step S201 of FIG. 6.

FIG. 7 illustrates a concrete example of the scanned image obtained in step S201 of FIG. 6.

In this case, the scanning is performed with a resolution of 600 dpi, which is equal to the resolution of dots embedded therein. In the scanned data obtained at this time, white pixels have a numerical value of "255" while black pixels have a numerical value of "0".

FIGS. 8 to 20 illustrate concrete examples of the inclination detecting filters employed in step S203 of FIG. 6.

In this case, thirteen types of filters A1 to A13 are employed.

The filtering process applied to scanned data is a process for substituting a maximum value for a black-designated pixel, out of two pixels which are a black-designated pixel and a gray-designated pixel on the filter, and this process is performed in order on all the pixels. Next, the value of "255" minus the pixel value of each pixel after the filtering process (namely, a value indicating the degree of black) is determined for each pixel and the total sum of such values of all the pixels is determined and stored. This numerical value is referred to as "the degree of inclination agreement" herein.

This filtering process has such a characteristic that, when dots exist at both the two positions used for the filtering process, the dots remain black, but when dots do not exist thereat, they are erased to be white-colored (become the same color as the back ground).

Accordingly, the degree of black of the image after the filtering process indicates how many similar dots exist at intervals of the positions of the two pixels on the filter.

Figure 8:
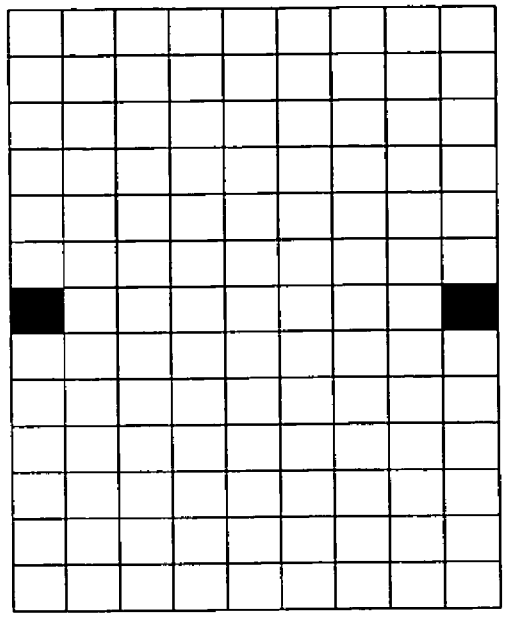
FIGS. 8 to 20 illustrate concrete examples of the inclination detecting filters.

By utilizing the aforementioned characteristic, filters corresponding to filter A1 of FIG. 8 which is inclined as illustrated in FIGS. 9 to 20 (filters A2 to A13) are prepared, and the same filtering process is performed in order therewith to calculate the degree of agreement of inclination.

Figure 9:
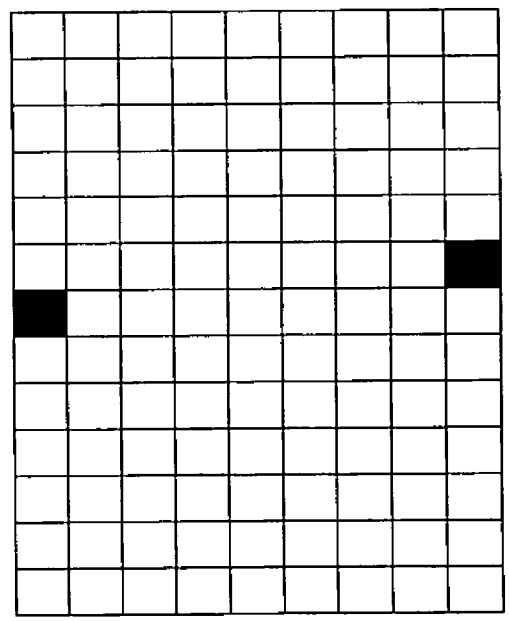
Figure 21:
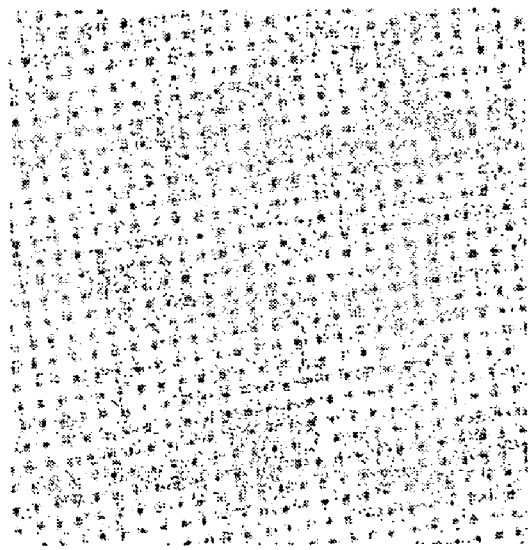
FIG. 21 illustrates an image which has been subjected to the filtering process of FIG. 9 (filter A2)
Figure 22:
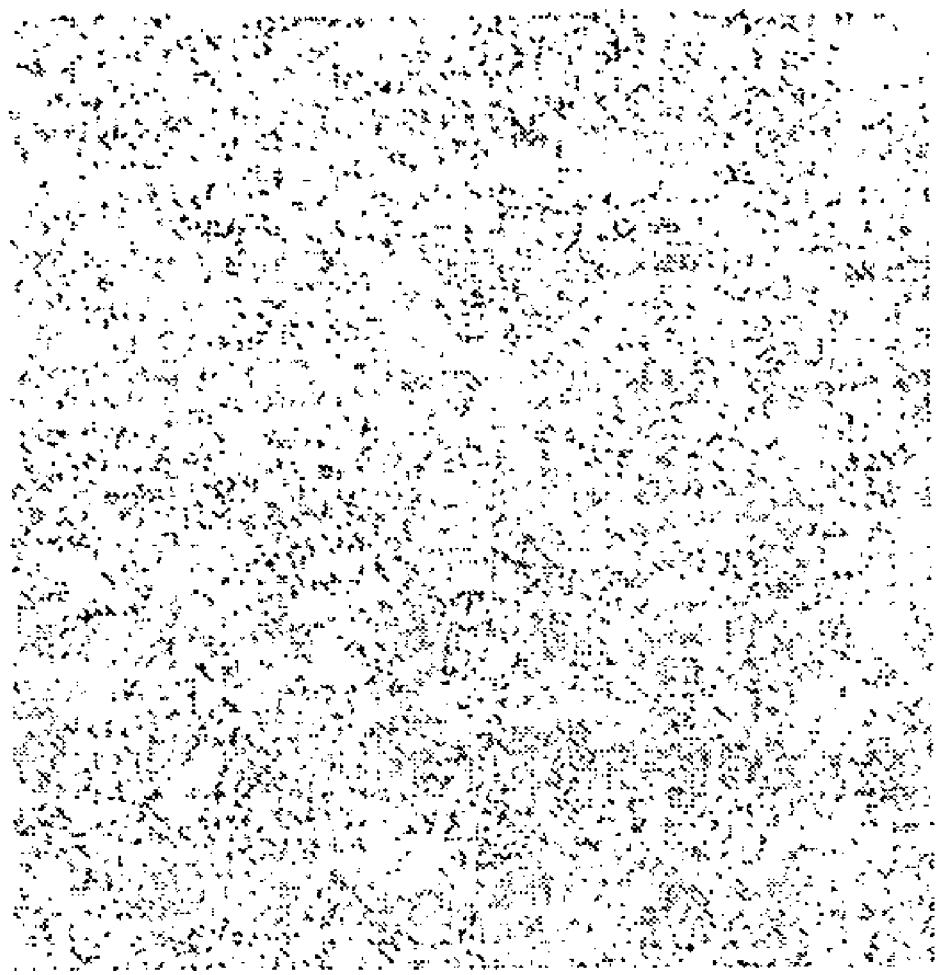
FIG. 22 illustrates an image which has been subjected to the filtering process of FIG. 20 (filter A13)
Figure 24:
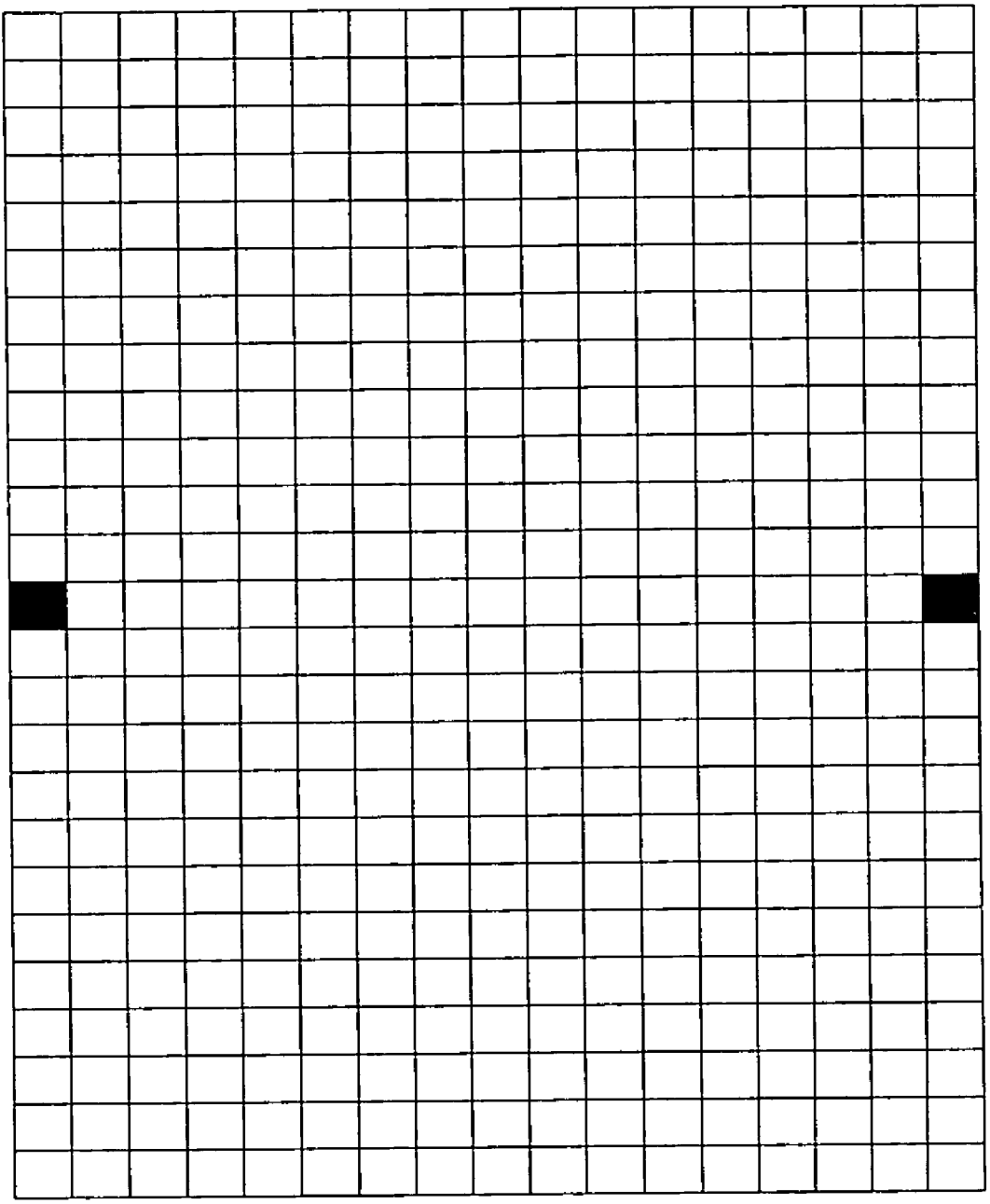
FIGS. 24 to 28 illustrate exemplary filters having 16-pixel intervals.
Figure 25:
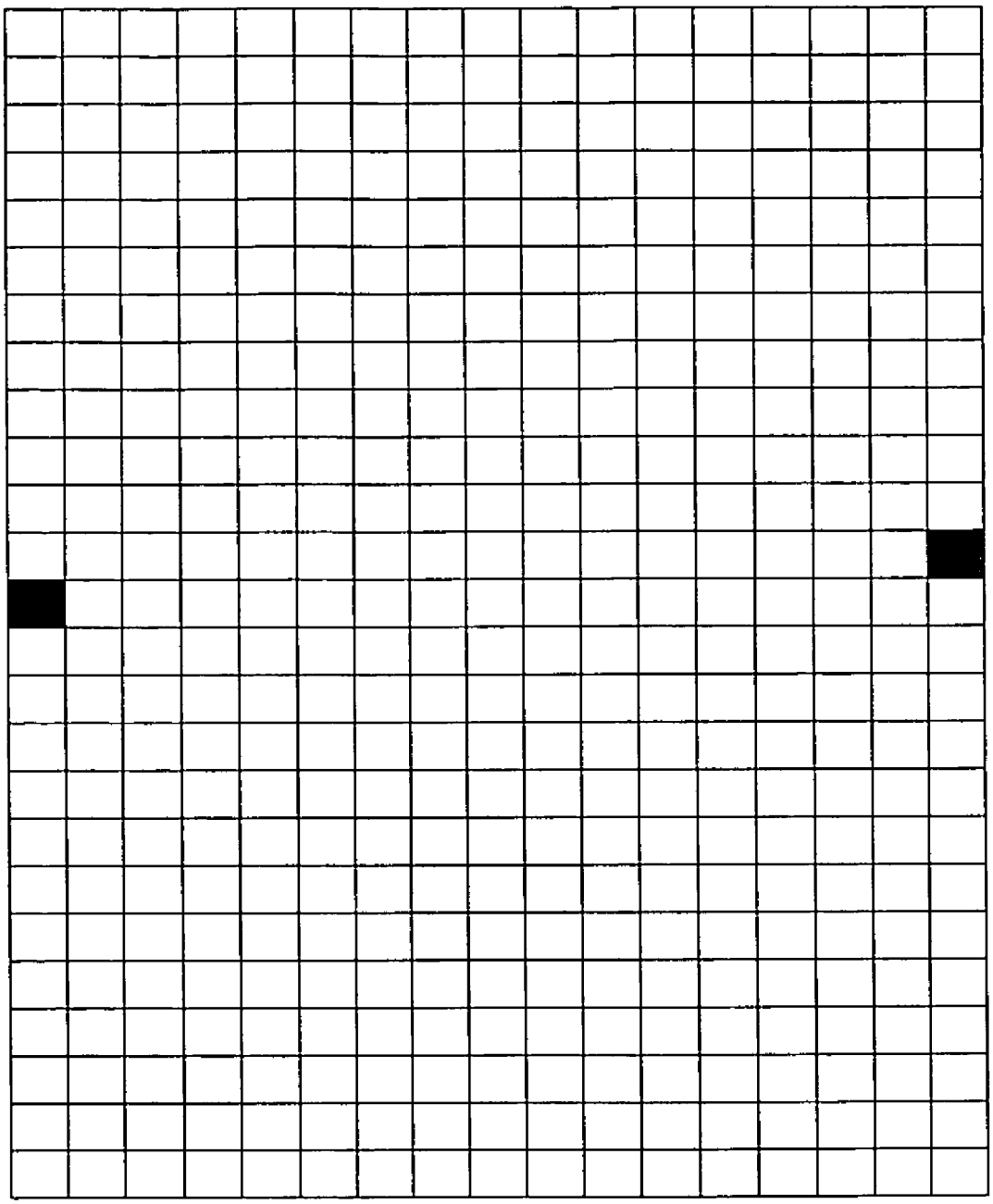
Figure 26:
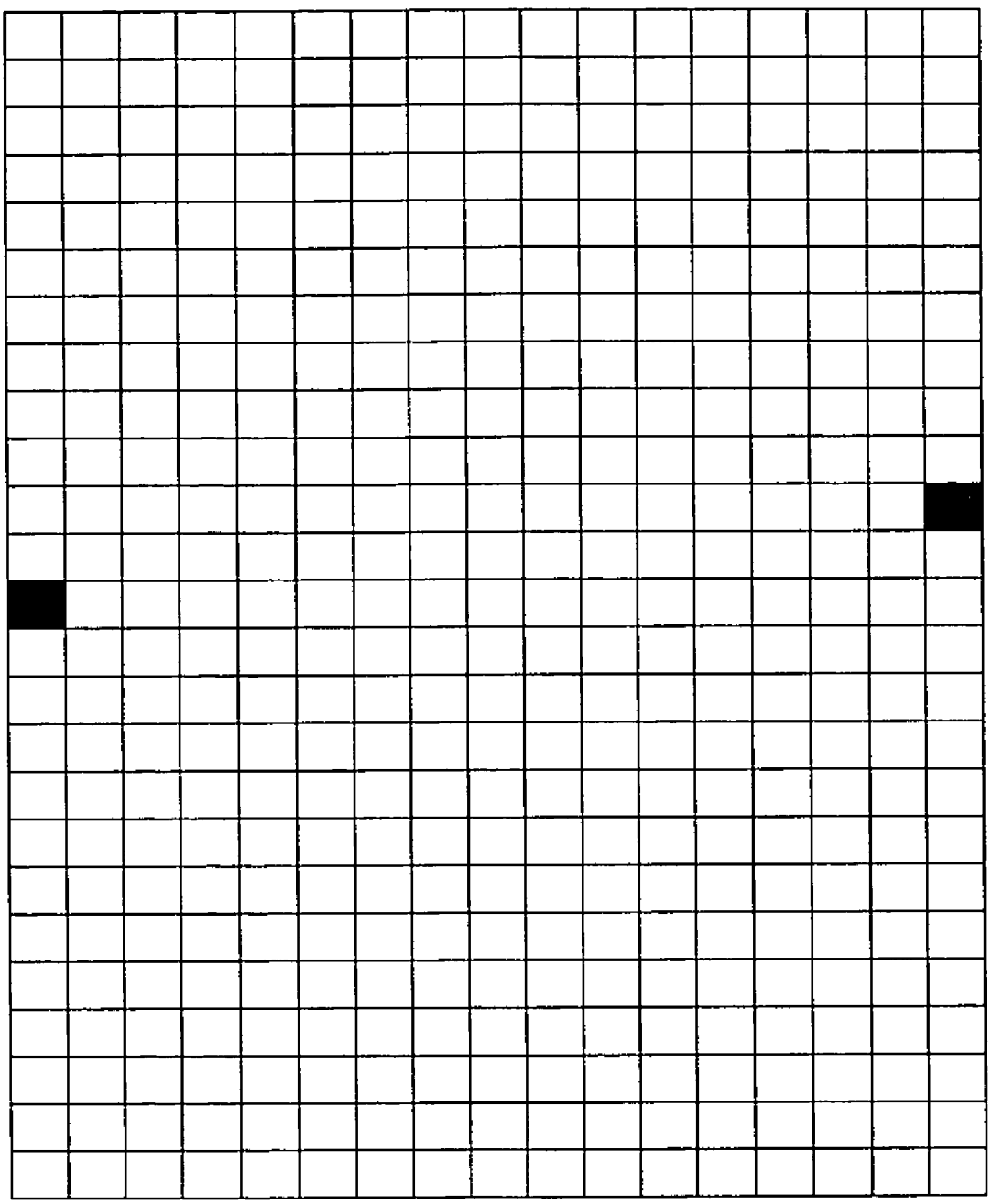
Figure 27:
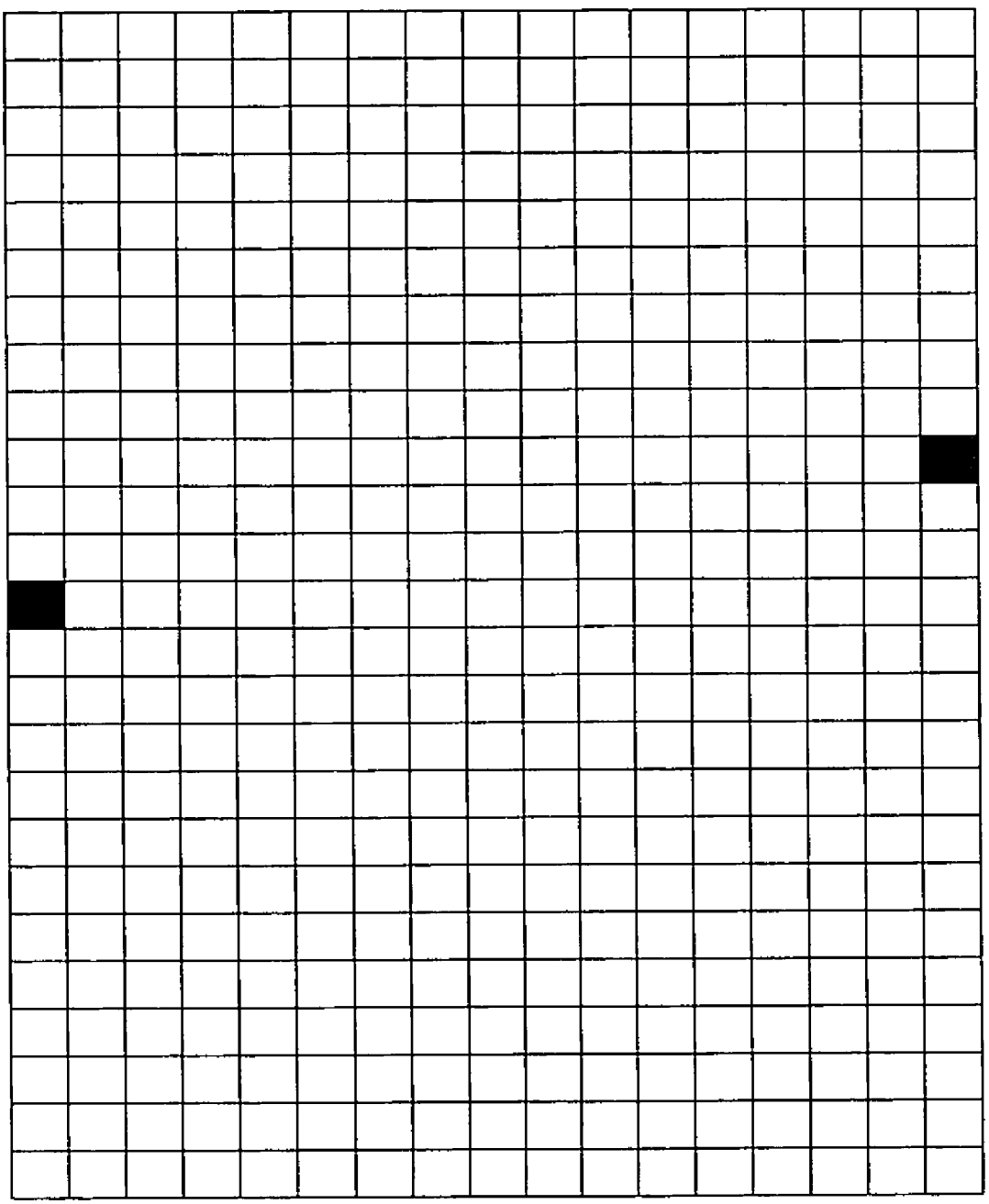
Figure 28:
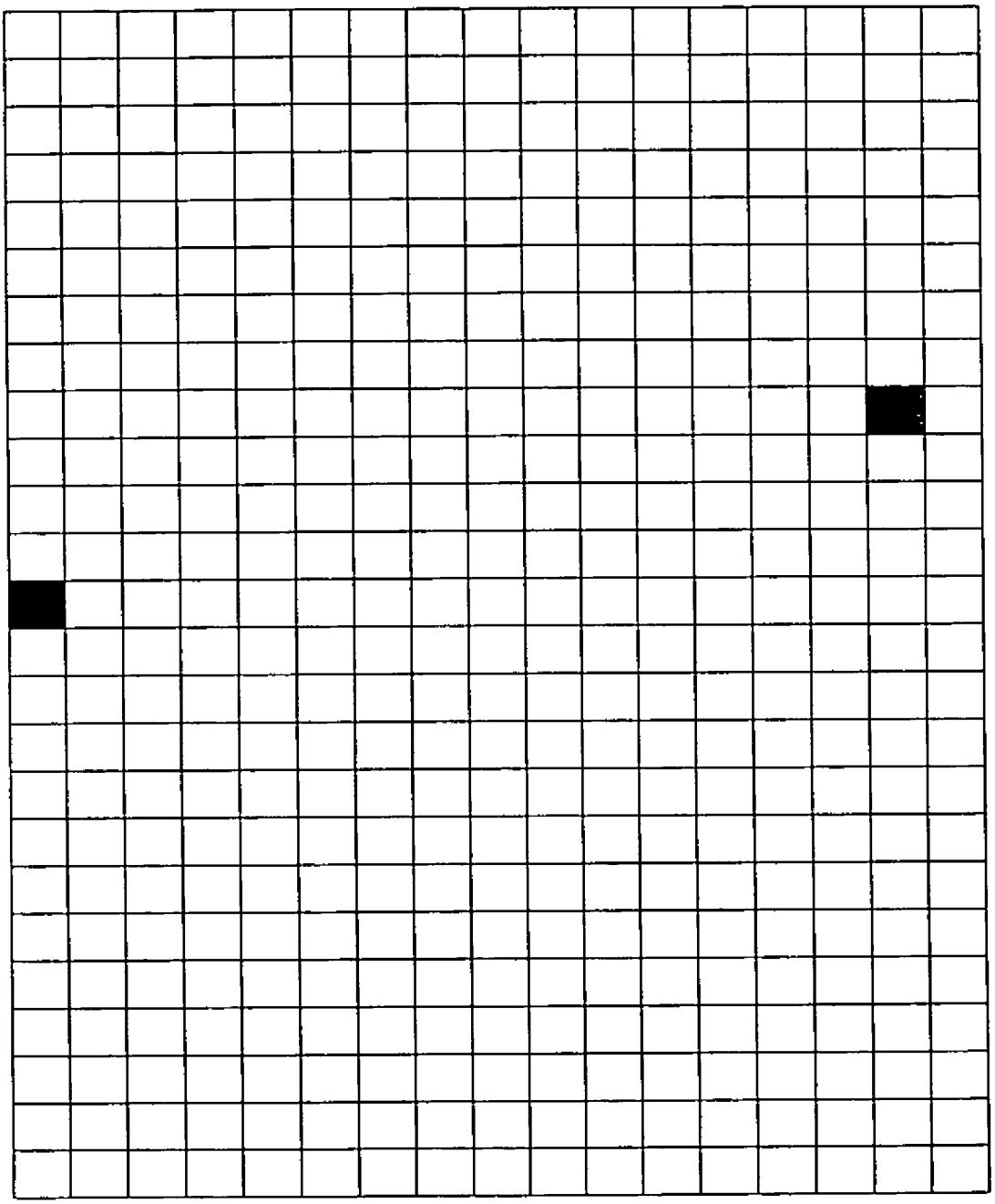

For example, FIG. 21 illustrates an image which has been subjected to the filtering process of FIG. 9 (filter A2) which exhibits an inclination close to the actual inclination of the dots of FIG. 7. FIG. 22 illustrates an image which has been subjected to the filtering process of FIG. 20 (filter A13) which exhibits an inclination significantly different therefrom.

As can be seen from the figures, dots are left in the image (FIG. 21) which has been subjected to the process with the filter exhibiting an inclination closer to the actual inclination, while dots have been erased in the image (FIG. 22) which has been subjected to the process with the filter exhibiting an inclination significantly different therefrom. Namely, if dots put on an image match the filter, the dots will be left. However, if the dots do not match the filter, the dots will be erased.

FIG. 23 illustrates the result of the application of filtering processes A1 to A13 to the image of FIG. 7.

Referring to the figure, the filtering process with filter A2 exhibited a highest degree of inclination agreement (which resulted in a largest number of dots after the filtering process). In this case, the gray pixel exists at a position (X, Y)=(8, −1) with respect to the black pixel (see FIG. 9) (wherein the black pixel is at an origin point, the rightward direction is the positive direction of X and the downward direction is the positive direction of Y).

Namely, since there is an inclination of −1 at the position which is forwardly shifted by 8 therefrom in the X direction, the inclination can be determined on the basis of the ratio as follows: $\tan^{-1}(-\frac{1}{8}) = -7.13°$.

In FIG. 23, the detectable inclination angles are in the range of about ±45°. Therefore, it is impossible to detect the difference between an inclination angle of −7.13° and an inclination angle of 172.87°, and both the inclination angles are detected as −7.130.

Second Embodiment

An image processing device according to a second embodiment has the same structure as that according to the first embodiment, and description thereof will not be repeated herein.

In the second embodiment, the angle is detected with higher accuracy than in the first embodiment. In the first embodiment, the filters with 8-pixel intervals (FIGS. 8 to 20) are employed for calculation of the inclination.

However, as can be seen from FIG. 23, the detectable inclination angle next to "0" is "7.13°" and, thus, the detection is performed at relatively large intervals. Therefore, in the second embodiment, the inclination angle is detected with higher accuracy.

This embodiment employs the fact that dots printed at 8-pixel intervals have the property of being also printed at even intervals which are an integral multiple of 8 pixels, for example, at 16-pixel intervals.

In FIG. 23, the image exhibited a highest degree of inclination agreement with filter A2 and, thus, the inclination thereof was determined to be −7.13°. Then, in order to perform more accurate detection, filters with 16-pixel intervals are employed only around an angle of −7.13°, which corresponds to filter A2, to perform detailed detection.

FIGS. 24 to 28 illustrate exemplary filters having 16-pixel intervals which are employed in the second embodiment.

Here, the employed filters are referred to as B1 to B5. Hereinafter, the filters exemplified in FIGS. 8 to 20, which have been described in the first embodiment, will be collectively referred to as filters A and the filters exemplified in FIGS. 24 to 28 will be collectively referred to as filters B.

Figure 29:
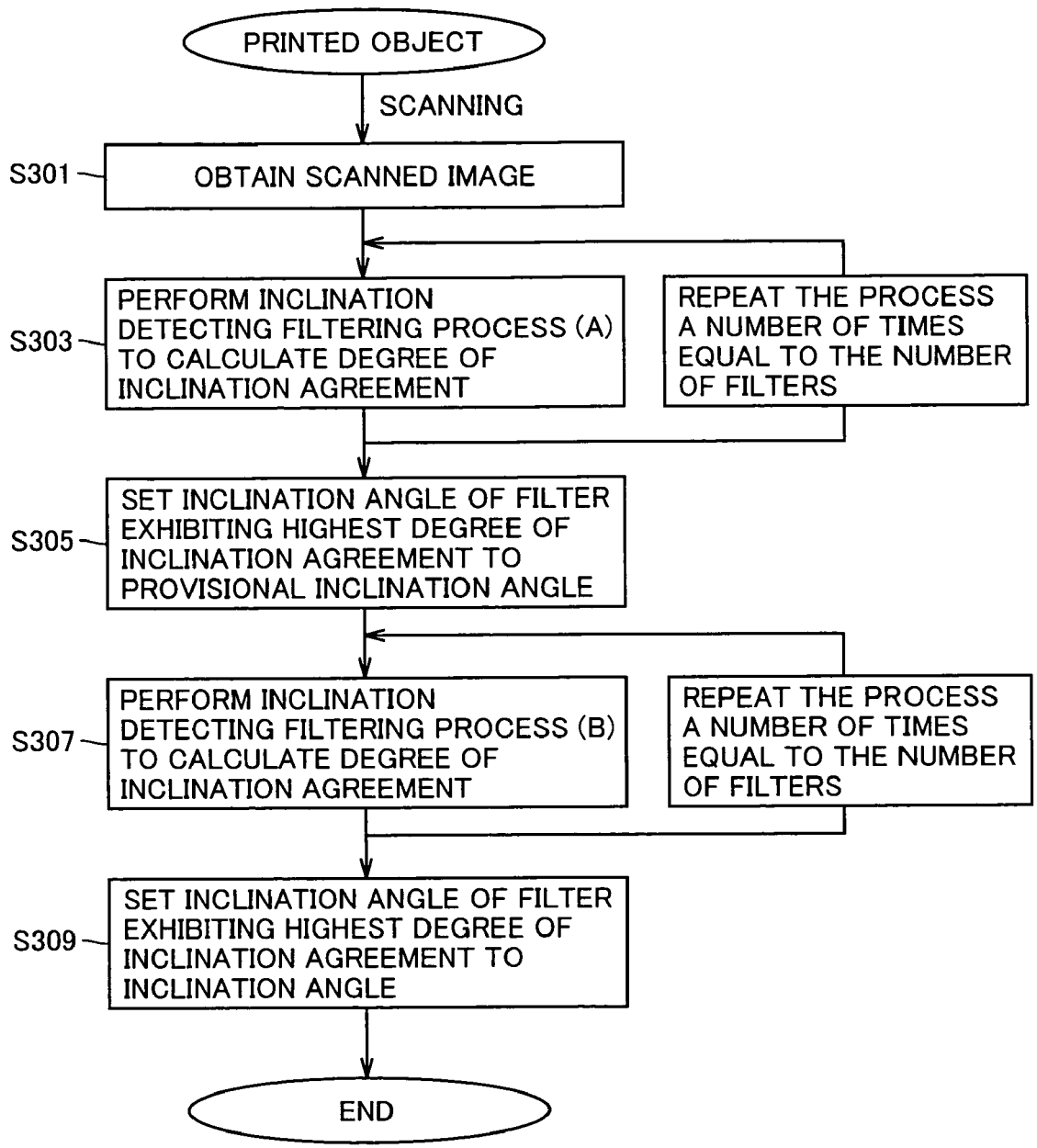
FIG. 29 is a flowchart illustrating the detail of an inclination detecting process (step S103 in FIG. 3) according to a second embodiment.

FIG. 29 is a flowchart illustrating the detail of an inclination detecting process (step S103 in FIG. 3) according to a second embodiment.

In step S301, a printed object is scanned with scanner 313 to provide a scanned image. In step S303, the scanned image is subjected to the inclination-detecting filtering process described in the first embodiment (here, referred to as "an inclination-detecting filtering process (A)") to calculate the degree of inclination agreement. The process in step S303 is repeatedly performed a number of times equal to the number of filters A.

In step S305, the inclination angle defined by a filter which exhibits a highest degree of inclination agreement with the scanned image is set to a provisional inclination angle of the printed object.

In step S307, the scanned image is subjected to the inclination-detecting filtering process exemplified in FIGS. 24 to 28 (here, referred to as "an inclination-detecting filtering process (B)") to calculate the degree of inclination agreement. The process in step S307 is repeatedly performed a number of times equal to the number of corresponding filters B.

In step S309, the inclination angle defined by a filter which exhibits a highest degree of inclination agreement with the scanned image is set to the inclination angle of the printed object.

FIG. 30 illustrates the correspondence between filters A and filters B.

It is assumed herein that the processing using filters A revealed that filter A exhibited a highest degree of agreement of inclination as illustrated in FIG. 23 and, thus, a provisional inclination angle of −7.13° was calculated. In this case, filters B1 to B5, which are filters B defining angles around the angle −7.13°, are employed and it is determined which of the five filters exhibits a highest degree of inclination agreement with the image to determine the inclination with higher accuracy.

As described above, an approximate angle is determined with the filters having a smaller pixel interval (filters A) and, thereafter, a precise angle is determined with a greater pixel interval (filters B). By taking such a plurality of steps, it is possible to reduce the total number of calculating processes, thereby offering the advantage of speeding up of the angle detection.

When there is the necessity of determining the inclination angle with higher accuracy, the size of filters B can be further increased. Namely, it is necessary only that the size of filters B is an integral multiple of the intervals among printed dots (an integral multiple equal to or more than twice thereof), and the multiplication ratio can be increased.

By using, for example, filters with 32-pixel intervals for detection, it is possible to determine the inclination angle with further higher accuracy.

Also, it is possible to use filters with 16-pixel intervals from the beginning for performing detection, instead of taking a plurality of steps involving the change from the filters with 8-pixel intervals to the filters with 16-pixel intervals.

Third Embodiment

Figure 32:
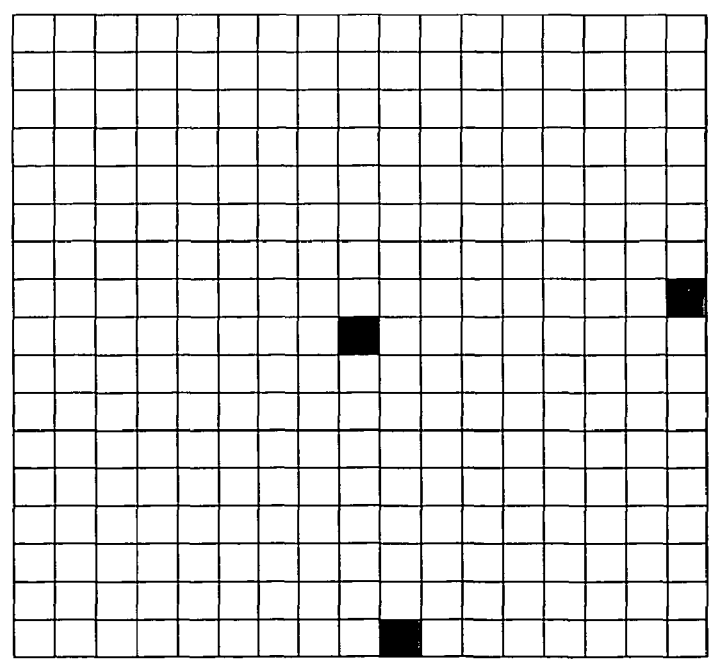
FIGS. 32 and 33 illustrate filters which correspond to the filter of FIG. 31 which is inclined.
Figure 33:
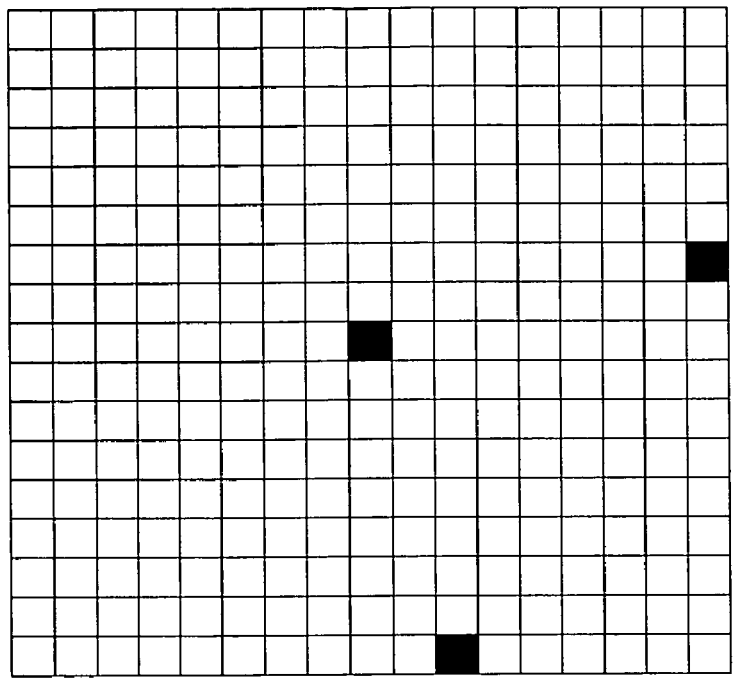

In a third embodiment, dots are embedded in image data such that they are arranged at even intervals in two directions and, on the basis of the dots, the inclination thereof is detected. In this case, dots are printed at 8-pixel intervals in the up-and-down direction and the lateral direction, as illustrated in FIG. 4. In this case, by utilizing the characteristic of the dots being printed at even intervals in the two directions, processes are performed with filters as illustrated in FIGS. 31 to 33.

Figure 31:
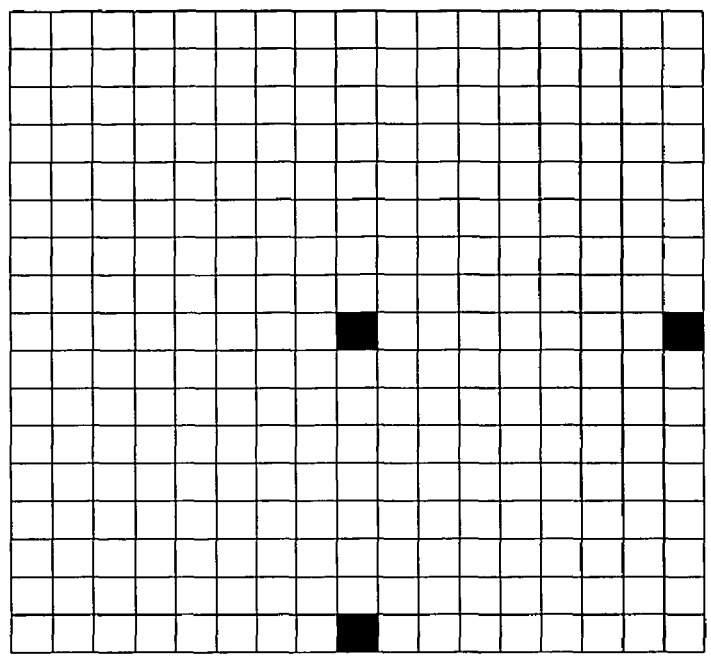
FIG. 31 illustrates a filter exhibiting an inclination angle of 0° according to a third embodiment.

A filter C1 illustrated in FIG. 31 is a filter corresponding to an inclination angle of 0°. Similarly to the first embodiment, filters corresponding to inclinations illustrated in FIGS. 32 and 33 are employed for performing detection.

These filters are used for performing a process of substituting a maximum value for the black pixel, out of a total of three pixels which are a black pixel and two gray pixels, similarly to in the first embodiment.

The inclination angle can be detected by using the table of FIG. 23, similarly to in the first embodiment.

This embodiment is different from the first embodiment in that filters utilize three pixels and thus exhibit higher resistance to noise during scanning, in comparison with filters utilizing two pixels.

Figure 34:
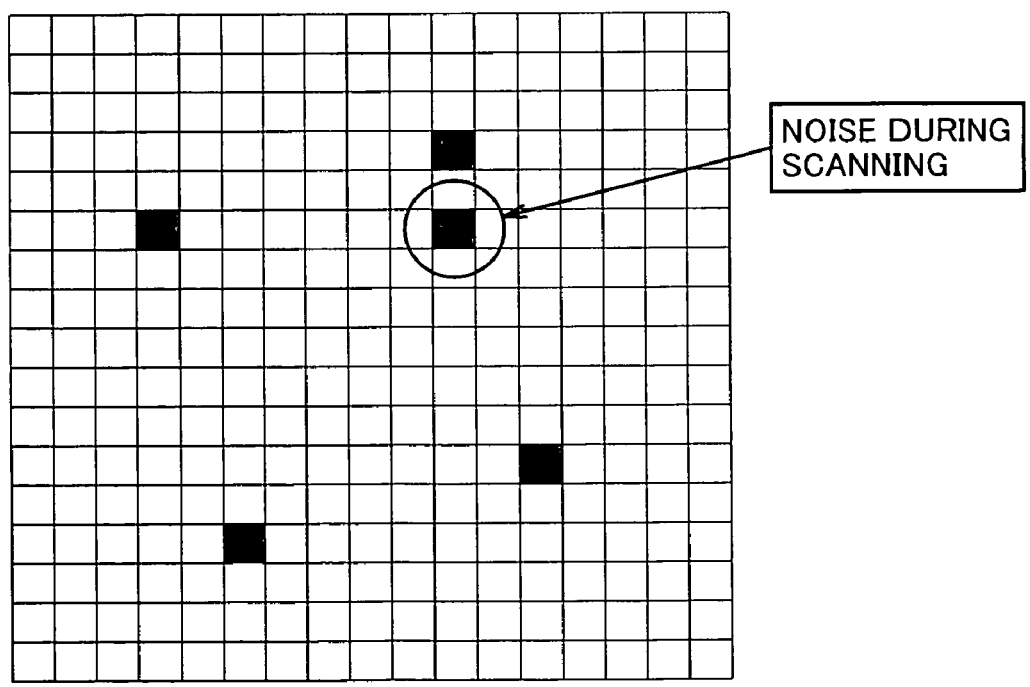
FIG. 34 illustrates the concept of a scanned image.

This will be described by using a conceptual illustration of a scanned image of FIG. 34. FIG. 34 illustrates that dots are successively printed in the longitudinal and lateral directions, except a single pixel designated as noise.

Figure 10:
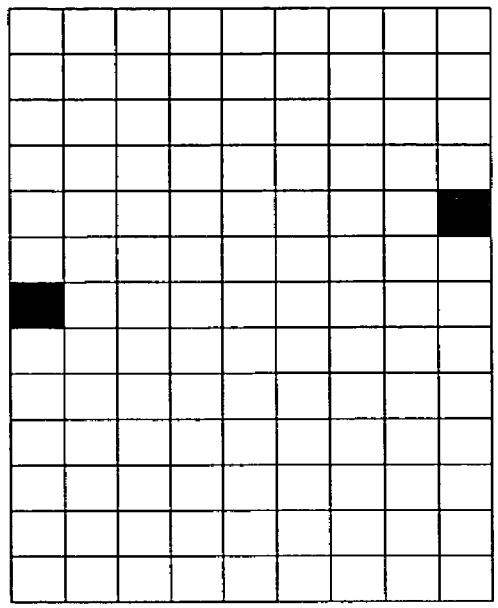
Figure 11:
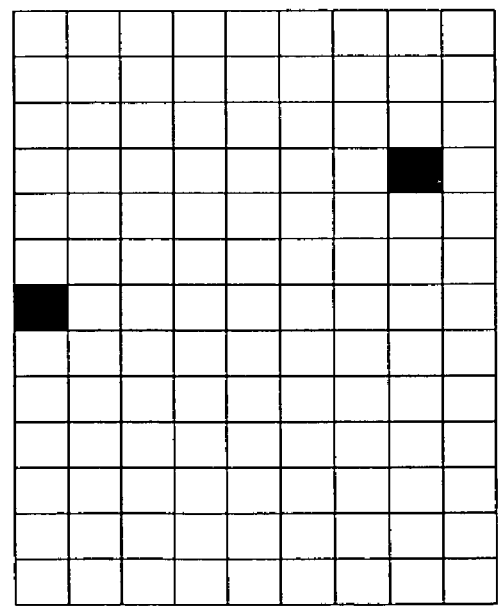
Figure 12:
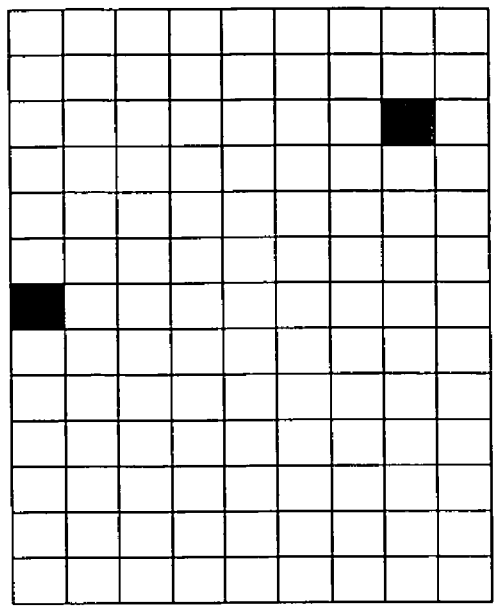
Figure 13:
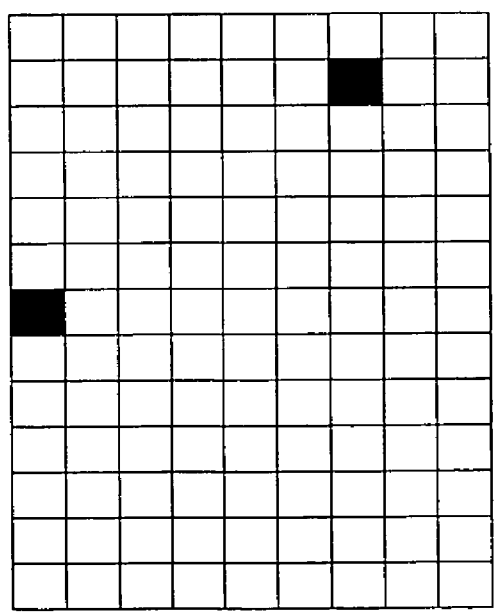
Figure 14:
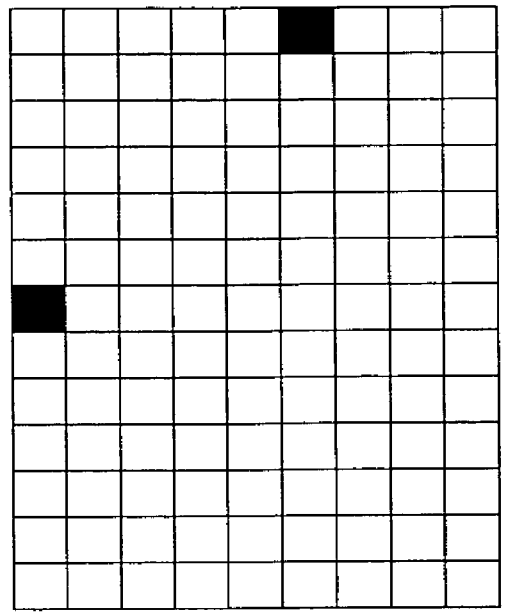
Figure 15:
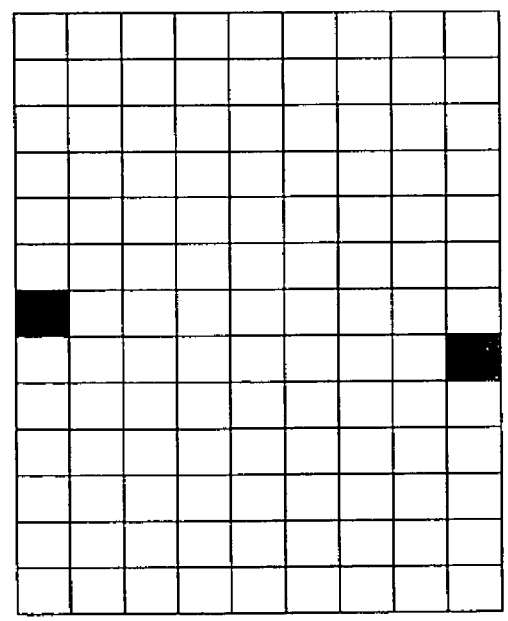
Figure 16:
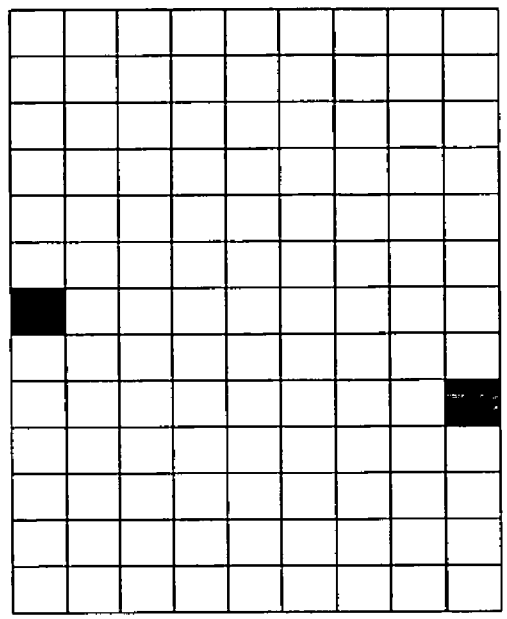
Figure 17:
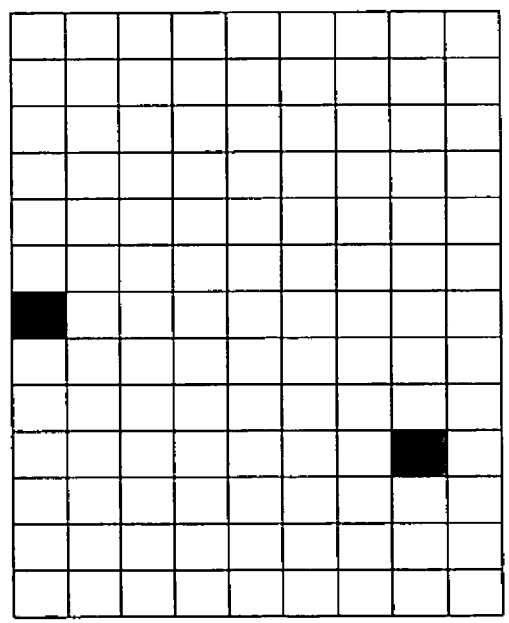
Figure 18:
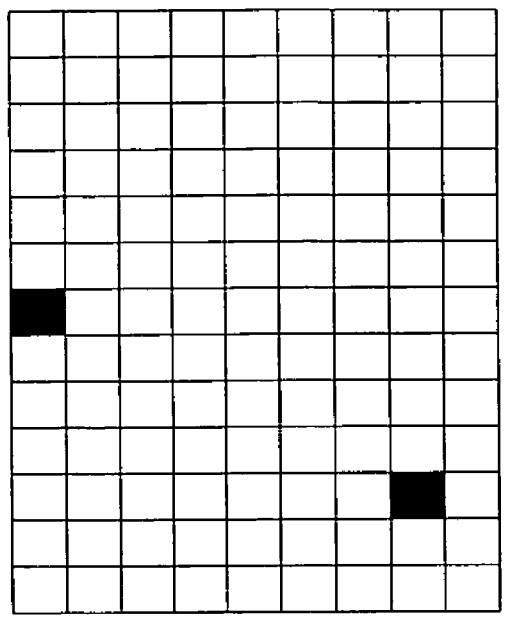
Figure 19:
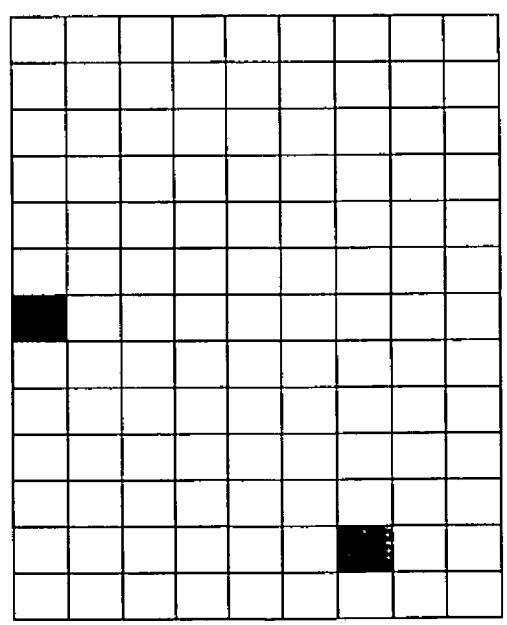
Figure 20:
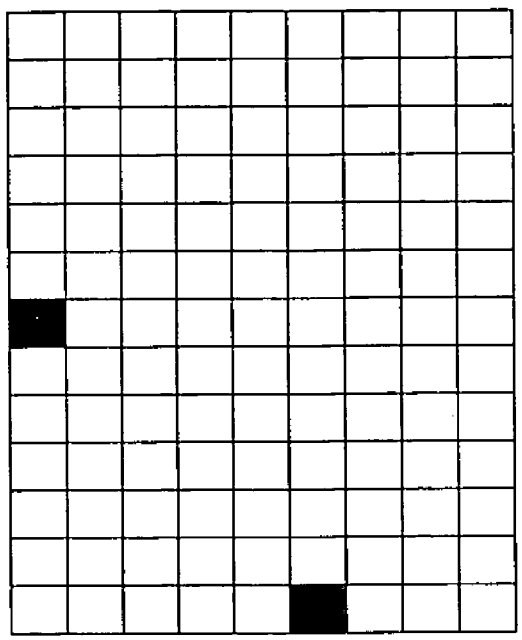
Figure 35:
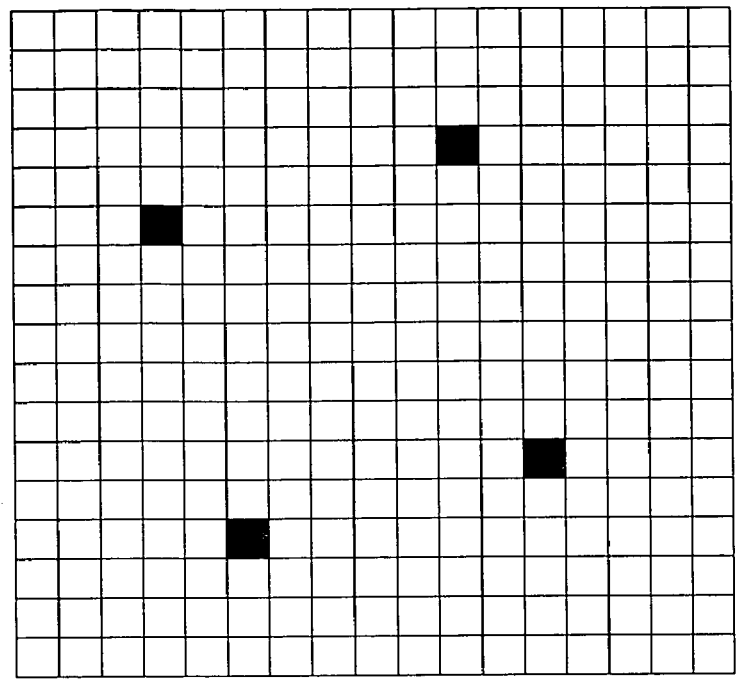
FIG. 35 illustrates the result of application of a filter A3 to the scanned image of FIG. 34.

In the case where this scanned image is subjected to the filters utilizing two pixels according to the first embodiment, when it is subjected to filter A3 of FIG. 10 which matches the inclination angle of the scanned image, four pixels remain gray as in FIG. 35.

Figure 36:
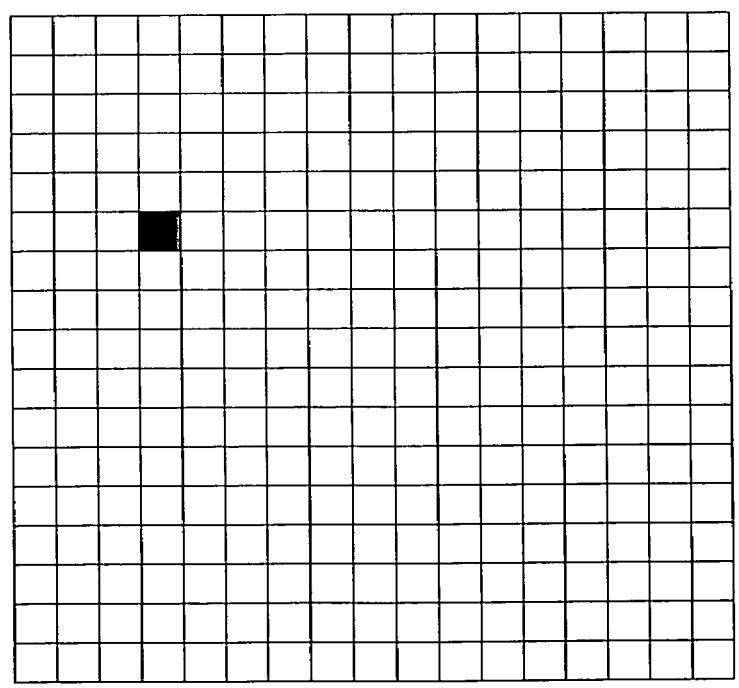
FIG. 36 illustrates the result of application of a filter A1 to the scanned image of FIG. 34.
Figure 37:
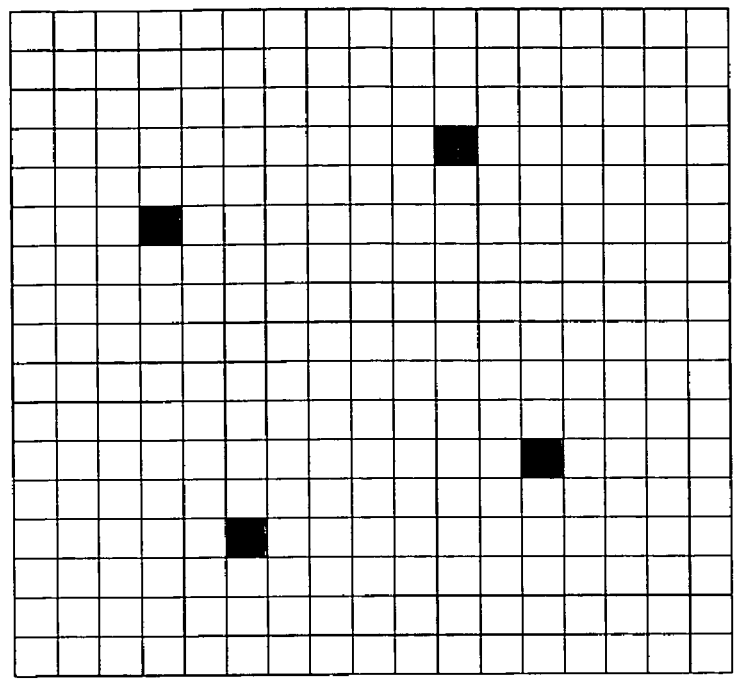
FIG. 37 illustrates the result of application of a filter C3 to the scanned image of FIG. 34.
Figure 38:
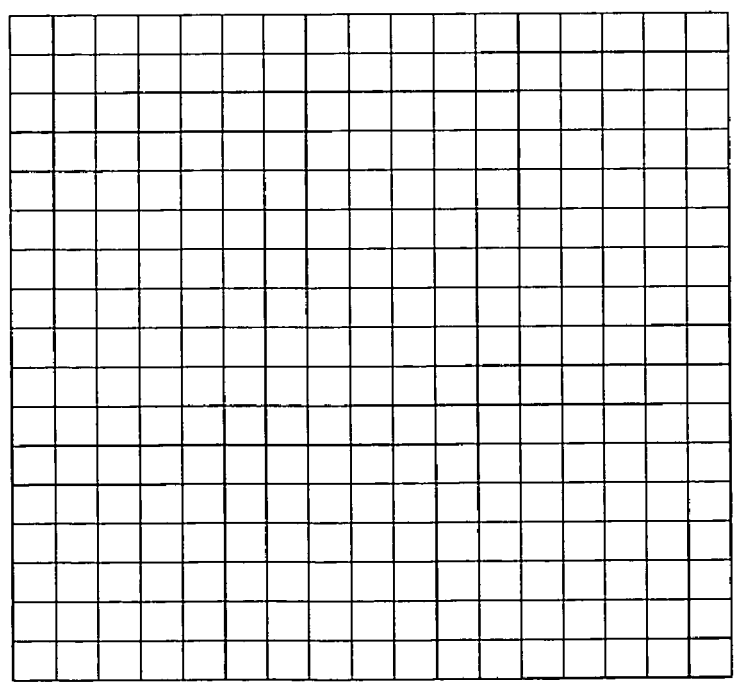
FIG. 38 illustrates the result of application of a filter C1 to the scanned image of FIG. 34.

Even when filter A1 of FIG. 8 which does not match the inclination angle is applied thereto, a single pixel will remain gray as in FIG. 36. However, in the case where the filters utilizing three pixels according to the third embodiment are applied thereto, when a filter C3 of FIG. 33 which matches the inclination angle is applied thereto, four pixels will remain gray as in FIG. 37. However, when a filter of FIG. 31 which does not match the inclination angle is applied, no pixel will remain gray as in FIG. 38, which indicates that the noise pixel exerts no influence on the result. This shows that the filters according to this embodiment have higher resistance to noise.

Fourth Embodiment

Figure 39:
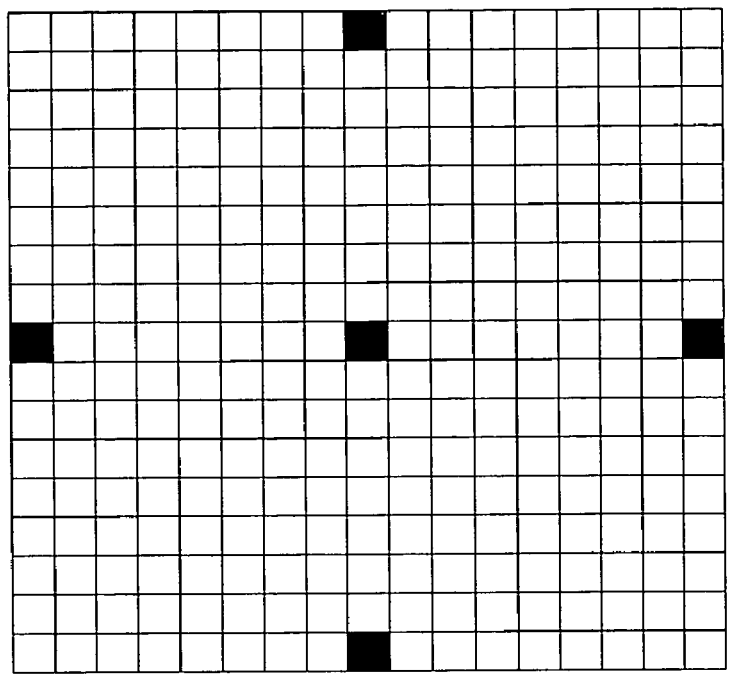
FIGS. 39 and 40 illustrate filters employed in a fourth embodiment.
Figure 40:
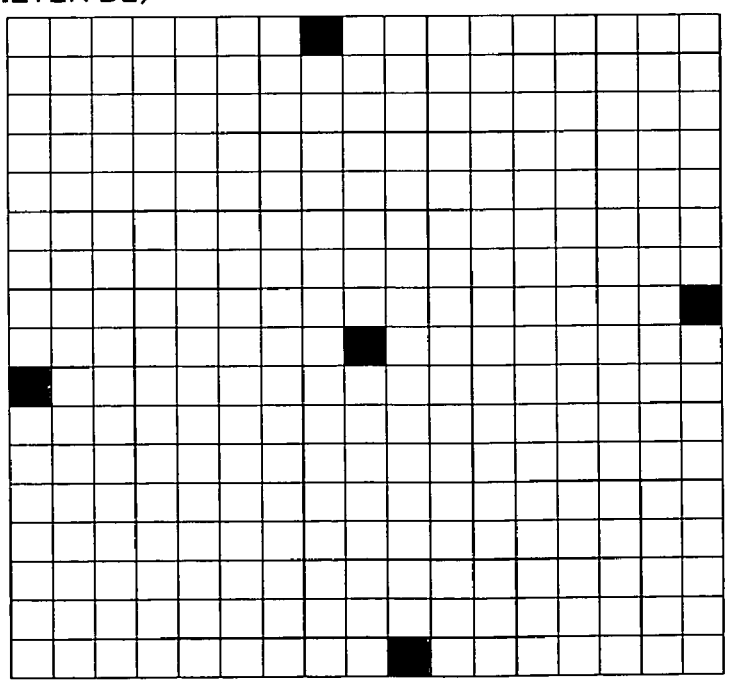

FIGS. 39 and 40 illustrate filters employed in a fourth embodiment.

By utilizing the characteristic of dots being successively printed at 8-pixel intervals in the upward-and-downward direction and in the lateral direction, on the assumption that the dots are put as in FIG. 4, filters employing five pixels as in FIG. 39 and FIG. 40 can be used to execute processes with higher resistance to noise.

FIG. 39 illustrates a filter corresponding to an inclination angle of 0°. By preparing a group of filters having inclinations as in FIG. 40, it is possible to execute detecting processes.

Fifth Embodiment

In this embodiment, an image processing device for rapidly correcting the inclination of an image will be provided. The image processing device according to this embodiment has the same structure as that illustrated in FIGS. 1 and 2 and, description thereof is not repeated herein.

Figure 41:
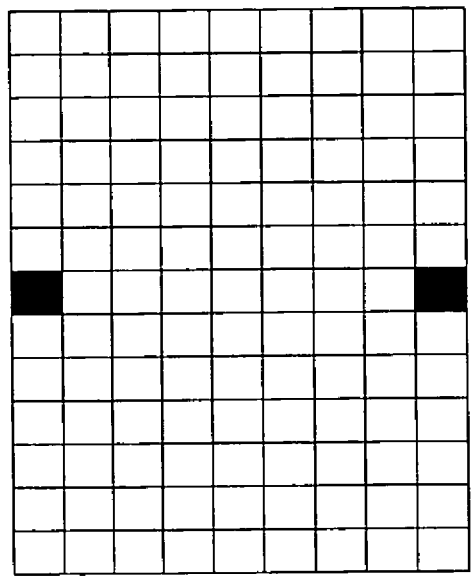
FIG. 41 illustrates the result of printing of dots at two pixels.
Figure 42:
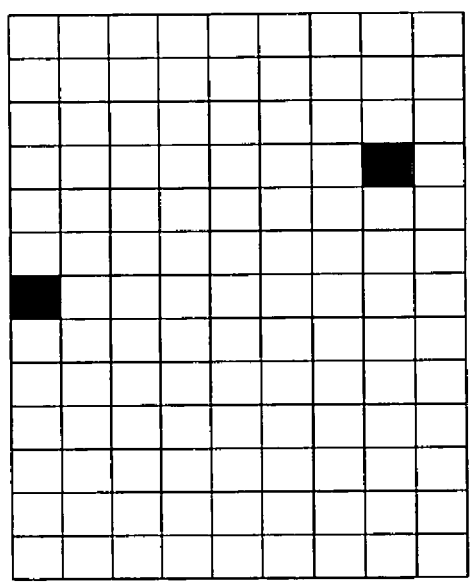
FIG. 42 illustrates a scanned image.

Here, there will be exemplified a case where dots are printed at least at two pixels as illustrated in FIG. 41 and, as a result, a scanned image as illustrated in FIG. 42 is acquired.

For comparison, a conventional inclination correcting method will be described at first.

Although the dots are placed at first as illustrated in FIG. 41, they are inclined and, consequently, the position of the gray-designated pixel is shifted (displaced) by +7 in the rightward direction and by −2 in the downward direction, with respect to the position of the black-designated pixel, as illustrated in FIG. 42. Accordingly, the inclination angle can be calculated to be $\tan^{-1}(-\sfrac{2}{7})=-23.3°$. The correction equation for correcting the inclination is as follows.

$$\begin{pmatrix} X' \\ Y' \end{pmatrix} = \begin{pmatrix} \cos(-23.2°) & \sin(-23.2°) \\ -\sin(-23.2°) & \cos(-23.2°) \end{pmatrix} \begin{pmatrix} X \\ Y \end{pmatrix} \quad (1)$$

Here, (X, Y) is the coordinate after the inclination correction and (X', Y') is the coordinate prior to the inclination correction, wherein the positive direction of X and X' is the rightward direction, the positive direction of Y and Y' is the downward direction and the positive direction of the angle is the clockwise direction.

In the aforementioned equation, the values of cos (−23.2°) and sin (−23.2°) are decimals, which induces the problem of the necessity of a long time for correction of the inclination.

Therefore, on the basis of the placement of pixels illustrated in FIGS. 41 and 42, the values of sin and cos can be approximated to integer ratios as follows to enable rapidly performing the inclination correction. Namely, referring to FIGS. 41 and 42, the gray dot is shifted by −3 pixels in the Y direction, during scanning. Further, the interval between the black pixel and the gray pixel is 8 pixels at first (FIG. 41). Accordingly, in FIG. 42, the value of sin of the inclination angle can be approximated to sin≈−3/8.

Similarly, referring to FIGS. 41 and 42, the gray dot is shifted by −1 pixel in the X direction, during scanning. Further, the interval between the black pixel and the gray pixel is 8 pixels at first and, the interval having a length of 8 pixels in the X direction is changed to an interval having a length of 7 pixels in the X direction. Accordingly, the value of cos of the inclination angle can be approximated to cos≈−7/8.

Accordingly, the inclination correcting equation can be expressed as follows.

$$\begin{pmatrix} X' \\ Y' \end{pmatrix} = \begin{pmatrix} \cos\theta & \sin\theta \\ -\sin\theta & \cos\theta \end{pmatrix}\begin{pmatrix} X \\ Y \end{pmatrix} = \begin{pmatrix} 7/8 & -3/8 \\ 3/8 & 7/8 \end{pmatrix}\begin{pmatrix} X \\ Y \end{pmatrix} = \begin{pmatrix} X \times 7/8 - Y \times 3/8 \\ X \times 3/8 + Y \times 7/8 \end{pmatrix} \quad (2)$$

By truncating the remainders of the divisions, all the calculations can be performed with integers.

The aforementioned inclination correction can be performed by printing dots as illustrated in FIG. 41, for example, at the upper portions of paper sheets and also can be performed as a correcting process after detection of the inclination through the processes according to the first to fourth embodiments.

In the case of utilizing the result of the filtering process according to the first embodiment in performing the inclination correction, the values of sin and cos can be approximated as illustrated in FIG. 43.

Further, as to the following matrix in the aforementioned equation (2):

$$\begin{pmatrix} 7/8 & -3/8 \\ 3/8 & 7/8 \end{pmatrix},$$

the determinant is $58/64 (=7/8 \times 7/8 - 3/8 \times (-3/8))$, which indicates that the image has been entirely stretched into a larger size after the inclination correction. This means that, in FIG. 42, the interval between the dots, which is the square root of $7^2+3^2=58$, is approximated to 8. Accordingly, it is preferable to apply this inclination correction in cases where the entire contraction and enlargement of images do not matter.

By increasing the denominators of the approximated sin and cos values (8, in the aforementioned case), the sin and cos values can be approximated with significantly higher accuracy, thereby reducing the influence of the entire contraction and enlargement. Namely, by increasing the pixel intervals on the detection filters, it is possible to reduce the influence of the entire contraction and enlargement.

As described above, according to this embodiment, the values of sin and cos of the inclination can be approximated to integer ratios, thus enabling high-speed inclination corrections.

Sixth Embodiment

In a sixth embodiment, upside/downside discrimination and correction of images are performed to detect and correct the inclination in all directions over 360°. An image processing device according to this embodiment has the same structure as that illustrated in FIGS. 1 and 2, and description thereof will not be repeated herein.

Figure 44:
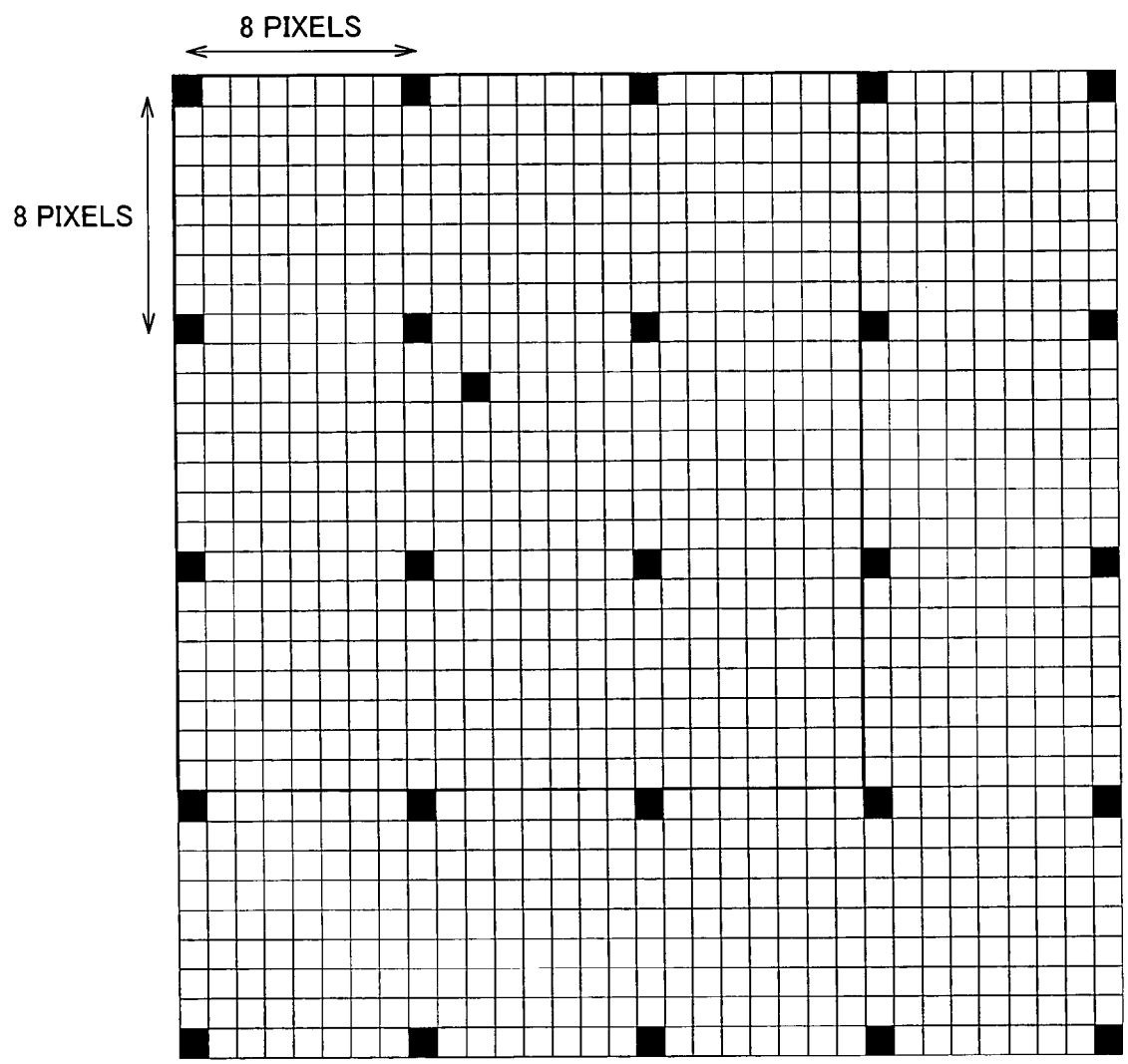
FIG. 44 illustrates dots printed in a sixth embodiment.

Here, instead of dots as illustrated in FIG. 4 according to the first embodiment, dots including an additional dot as illustrated in FIG. 44 are printed. In FIG. 4, a dot is added to the dots illustrated in FIG. 4, at a single pixel within a single cell designated by a thick line in FIG. 44 (a cell of 24 pixels× 24 pixels).

Figure 45:
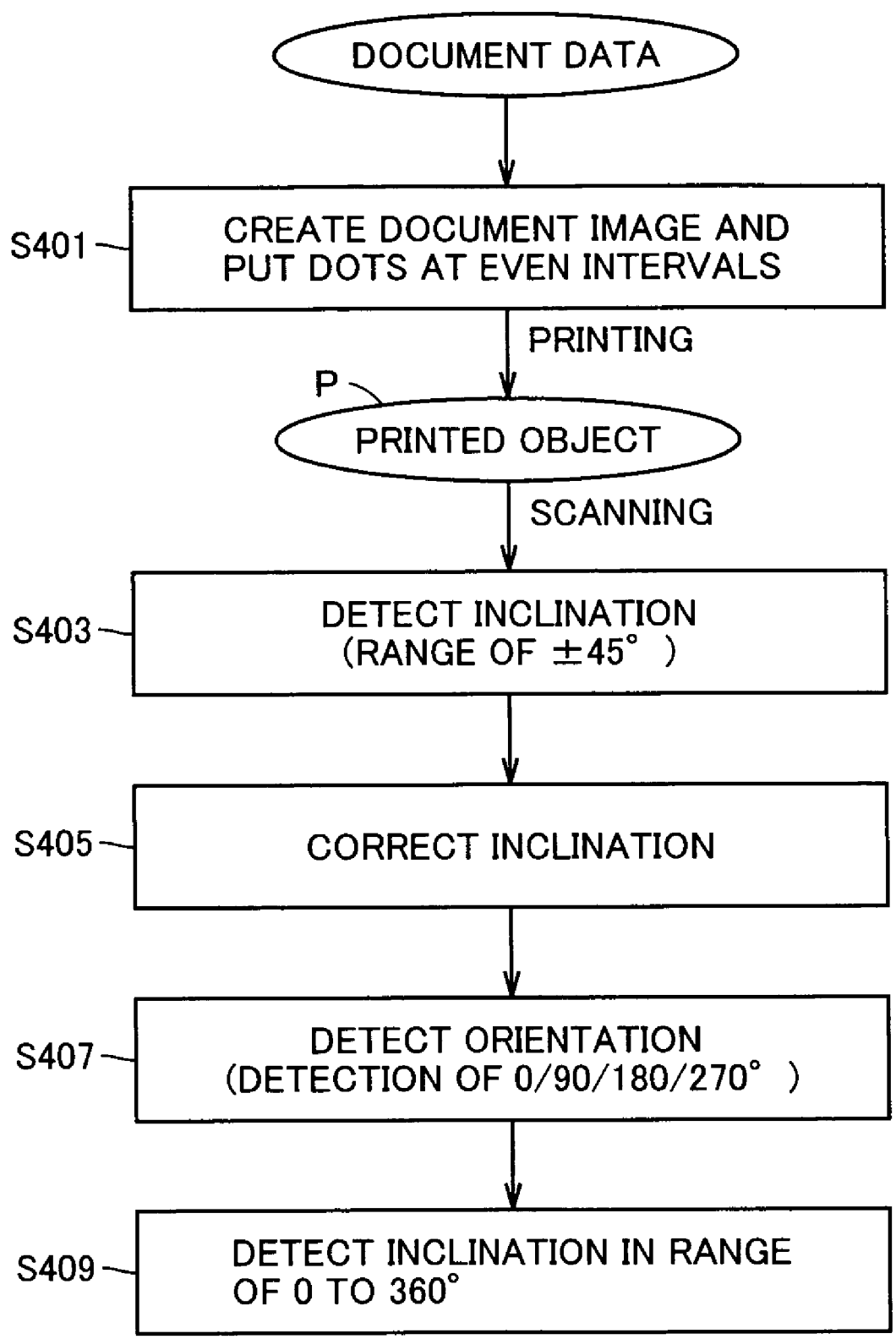
FIG. 45 is a flowchart illustrating an inclination detecting process which is executed by an image processing device according to the sixth embodiment.

FIG. 45 is a flowchart illustrating an inclination detecting process which is executed by the image processing device according to the sixth embodiment.

Referring to the figure, in step S401, a document image is created and then dots as in FIG. 44 are attached to the data. The image data including the dots attached thereon is printed to provide a printed object P. Printed object P is scanned and the inclination (in the range of ±45°) of the image is detected with the method according to the first embodiment. In step S405, the inclination is corrected with the method according to the fifth embodiment.

In step S407, the orientation of the image (0°, 90°, 180° or 270°) is detected from the dot added at a single pixel within the single cell designated by the thick like in FIG. 44. In step S409, on the basis of the result of this detection, the inclination of the image is detected in the range of 0 to 360°.

Figure 46:
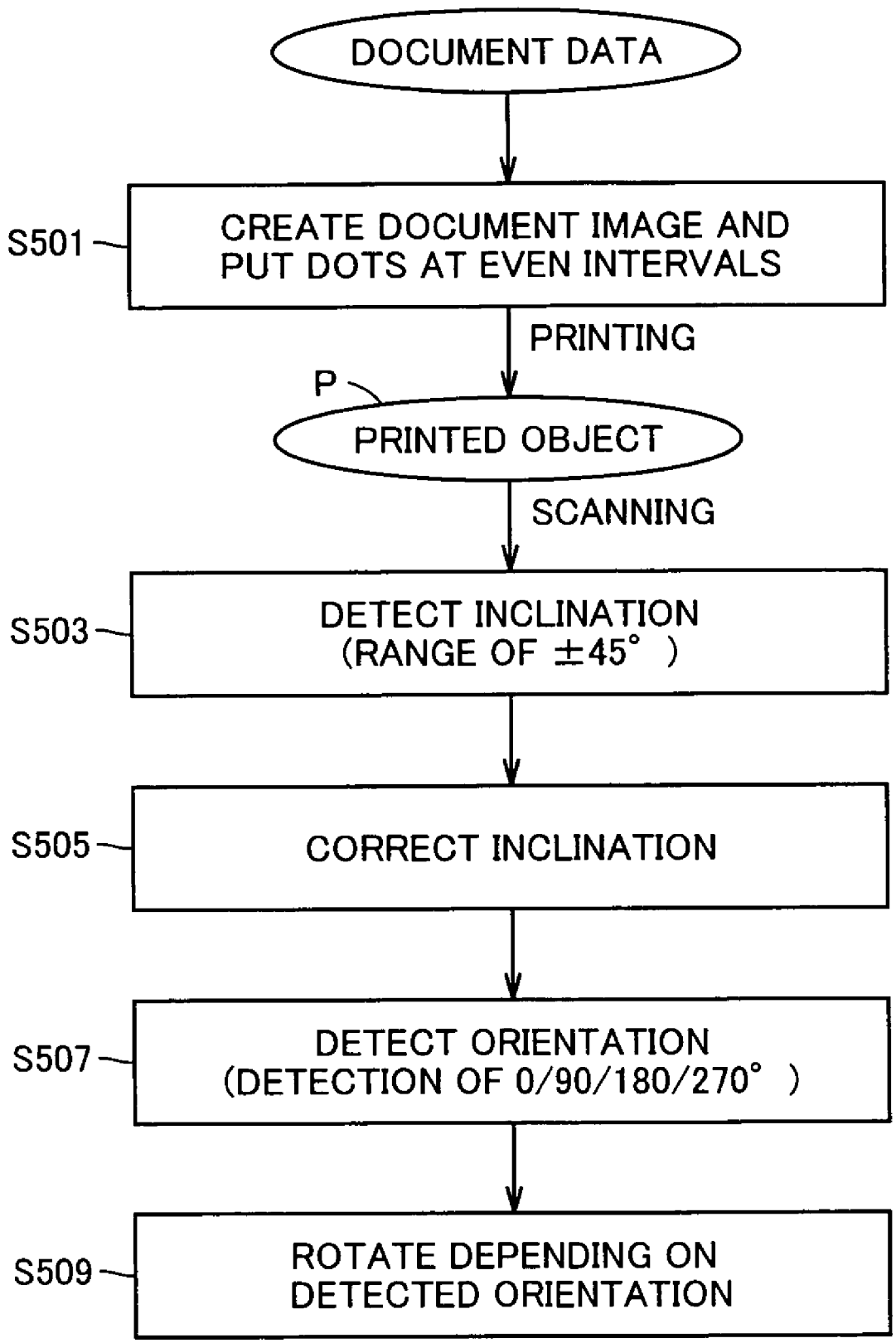
FIG. 46 is a flowchart illustrating an inclination correcting process which is executed by the image processing device according to the sixth embodiment.

FIG. 46 is a flowchart illustrating an inclination correcting process which is executed by the image processing device according to the sixth embodiment.

Referring to the figure, the processes in steps S501 to S507 are the same as the processes in steps S401 to S407 in FIG. 45. In step S509, the image is rotated depending on the orientation detected in step S507 to provide an image oriented in the original direction.

The dots in FIG. 44 are substantially the same as those in FIG. 4, which enables detecting the inclination in the angle range of ±45° with the method according to the first embodiment and also enables correcting the inclination with the method according to the fifth embodiment.

This corrected image is subjected to an orientation detecting process using a filter of FIG. 47.

Namely, the pixel values of four pixels at black-colored positions in FIG. 47 are summed and, if the sum is equal to or less than a certain threshold value (for example, 100), they are determined to be dot positions and, in this case, the pixel values at four gray-colored positions in FIG. 47 are separately summed and stored. Namely, the pixel values at the four gray-colored positions are separately summed such that the upper-left pixel value, the upper-right pixel value, the lower-left pixel value and the lower-right pixel value are added to data a, data b, data c and data d, respectively.

Every time dot positions are detected as described above, values are added to a, b, c and d and, finally, it is determined which of values a, b, c and d is smallest. By performing this determination, it is possible to statistically determine the positions of dots, out of the four gray-colored positions. On the basis of the result of this determination, it can be determined which of 0°, 90°, 180° and 270° is the direction of the rotation of the image. For example, if data c of the lower-left pixel has a smallest value among data a, b, c and d, it can be determined that there are many "270°" patterns in FIG. 48 and, therefore, it can be determined that the image is rotated by 270°.

When there is a need for grasping the angle of rotation, the following process can be executed.

For example, when the inclination angle is determined to be −7.13° with the method according to the first embodiment and also the rotation is determined to be 270° with the method according to the sixth embodiment, the angle of rotation can be determined to be 270−7.13=262.87°.

Further, when there is the necessity of correction, the inclination can be corrected by −7.13° with the method according to the fifth embodiment and then the image can be rotated by 270° to attain the correction.

As described above, according to this embodiment, in addition to evenly-spaced dots, a dot is put at a position which appears differently depending on whether the image is rotated by 0, 90, 180 or 270° and upside/downside discrimination is performed, which enables detection and correction of the angle of rotation in all directions over 360°.

Seventh Embodiment

In a seventh embodiment, there will be provide an image processing device capable of improving the accuracy of angle detection, in comparison with the first embodiment.

In this embodiment, in step S205 in FIG. 6, a filter exhibiting a highest degree of inclination agreement is selected and, then, the inclination angle is determined, in consideration of the degrees of inclination agreement exhibited by the adjacent filters.

The principle thereof will be described, using FIG. 49. It is assumed that filter A2 is selected on the basis of calculation of a highest degree of inclination agreement, at first. Next, a comparison is made between adjacent filters A3 and A1, in terms of the degree of inclination agreement. The degree of inclination agreement with filter A3 is "3636618" and the degree of inclination agreement with filter A1 is "3480535". This shows that the actual inclination angle is closer to that of filter A3 although filter A2 has been selected. Namely, the position of a peak of the degree of inclination agreement can be estimated.

Figure 50:
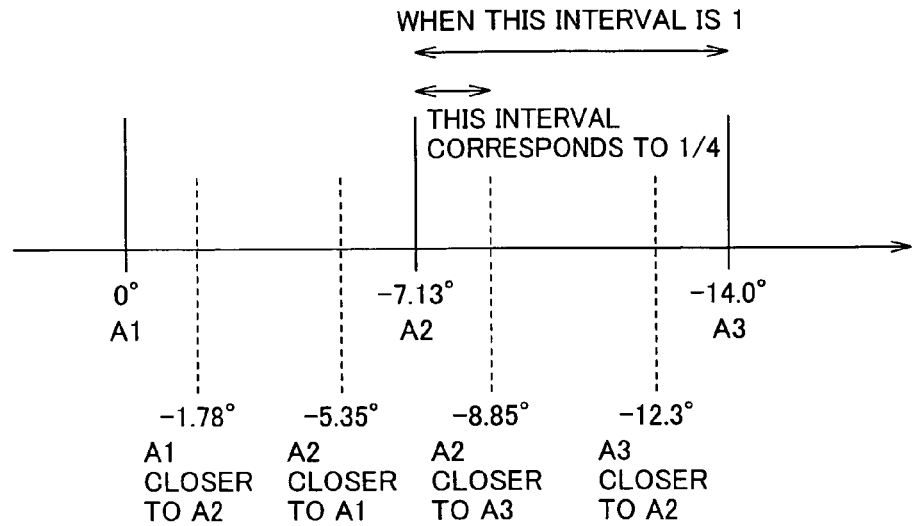
FIG. 50 illustrates the principle of the seventh embodiment.

Referring to FIG. 50, assuming that the intervals among 0°, −7.13° and −14.0°, which are the inclination angles of filters A1 to A3, are 1, the positions spaced apart by ±¼ from the respective inclination angles are defined. In FIG. 50, the defined positions are −1.78°, −5.35°, −8.85° and −12.3°, and the respective positions represent A1 closer to A2, A2 closer to A1, A2 closer to A3 and A3 closer to A2.

On the basis of the aforementioned concept, detectable inclination angles are subdivided as illustrated in "inclination angle (extended)" in FIG. 49, in order to improve the detection accuracy. In the aforementioned example, although filter A2 is selected on the basis of the comparison of the degree of inclination agreement, the actual inclination angle is considered to be closer to that of filter A3 and, therefore, the inclination angle can be determined to be −8.85°. This enables detections with accuracy which is twice that of the first embodiment.

Eighth Embodiment

While in the aforementioned embodiments the image processing devices are constituted by a PC or the like, it is possible to constitute an image processing device by an MFP (Multi Function Peripheral).

Figure 51:
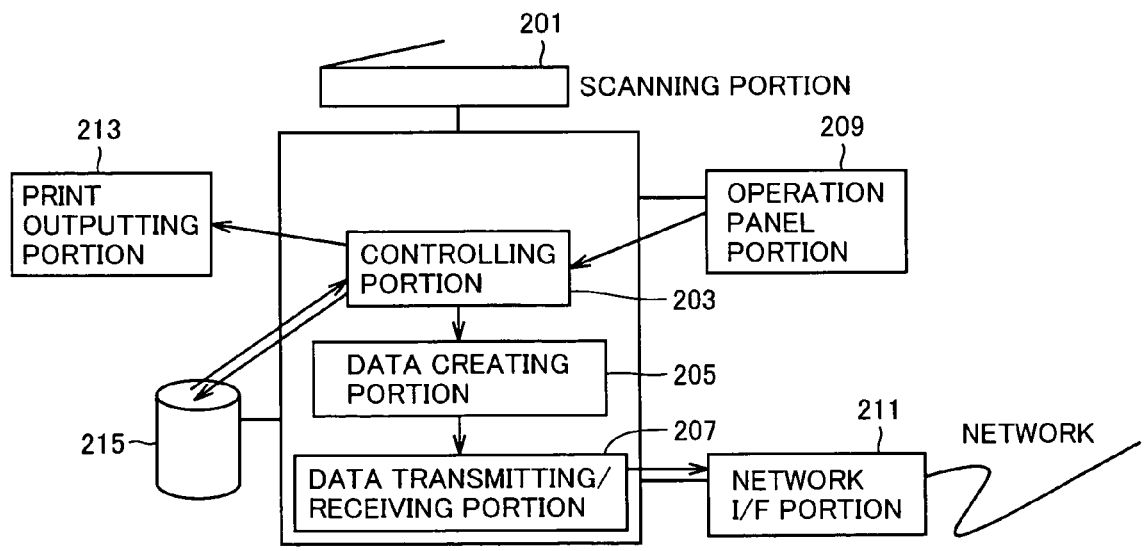
FIG. 51 is a block diagram illustrating the structure of an image processing device.

FIG. 51 is a block diagram illustrating the structure of such an MFP.

The MFP illustrated in FIG. 51 executes the process of the flow chart illustrated in FIG. 3 to perform an inclination detecting process and an inclination correcting process similar to those of the first to seventh embodiments.

The MFP includes a scanning portion 201 which reads documents, a controlling portion 203 which controls the entire device, a data creating portion 205 which creates data, a data transmitting/receiving portion 207 and a network I/F portion 211 which transmit and receive data through a network, a print outputting portion 213 which includes a printing engine and records images on papers, a storage portion 215 which stores data and an operation panel portion 209 which receives operations from a user.

EFFECTS IN THE EMBODIMENTS

As previously described, according to the aforementioned embodiments, the inclination can be detected by utilizing dots printed at even intervals. Further, a filtering process can be applied thereto to provide the advantage of speeding up of the inclination detection. According to the fifth embodiment, the detected inclination can be approximated to an integer ratio, thereby enabling rapid inclination correction.

Accordingly, by printing dots at portions of documents, it is possible to automatically correct the inclinations of images during copying and scanning.

Further, according to the aforementioned embodiments, filters do not response to dots other than evenly-embedded dots, which enables putting dots on images for another purpose. Accordingly, it is possible to put, for example, dots representing bits as electronic watermarks. Further, it is possible to provide the advantage of high resistance to noise (unnecessary dots which are unintentionally printed).

According to the aforementioned embodiments, there is no need for determination with electronic watermarks, thereby offering the advantage of speedup of the process. However, it is possible to perform determination with electronic watermarks.

Further, according to the aforementioned embodiments, dots are put on image data and, on the basis of the dots, inclination detections and corrections are performed, thereby providing the advantage that the inclination detections and the corrections can be performed on images including no document data (texts and the like).

While, in the aforementioned examples, there have been exemplified image processing devices including a printer and a scanner integrated thereinto, the printer and the scanner may be separated. In such a case, an image processing device including a printer performs printout of images including dots to provide printed objects and an image processing device including a scanner reads the printed objects to perform detection and correction of the inclination.

Further, while in the aforementioned examples there have been exemplified dots each constituted by a single pixel, dots constituted by a plurality of pixels may be attached to printed objects and detection may be performed on the basis of such dots. Further, any periodic dots having certain shapes may be employed and dots may be also embedded in iterative patterns.

Further, it is possible to provide programs for executing the processes illustrated by the flowcharts and the block diagrams in the aforementioned embodiments. Also, it is possible to record such programs in recording mediums such as CD-ROMs, flexible disks, hard disks, ROMs, RAMs, memory cards for providing them to users. Further, such programs may be downloaded to the device through a communication line such as the internet.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing device comprising:
   an inputting portion which inputs image data obtained by reading a printed object having dots put thereon at a predetermined interval;
   a first processor which processes said input image data with a first filter for detecting inclination agreement between said dots on the printed object and dots which are included in the first filter and arranged at a first inclination angle and at the predetermined interval;
   a second processor which processes said input image data with a second filter for detecting inclination agreement between said dots on the printed object and dots which are included in the second filter and arranged at a second inclination angle being different from the first inclination angle and at the predetermined interval; and
   a detector which detects an inclination angle of said image data, on the basis of an output from the processes performed by said first and second processors.

2. The image processing device according to claim 1, wherein
   said first and second filters are filters for determining whether or not the positional relationship between at least two dots is a predetermined positional relationship.

3. The image processing device according to claim 2, wherein
   said first and second filters each include a pair of dots having the same interval as the interval between said dots put on said printed object.

4. The image processing device according to claim 3, further comprising:
   a plurality of filters, wherein
   the plurality of filters are filters each including a pair of dots having the same interval as that between said dots put on said printed object, the filters being inclined at different angles, and said detector performs, in order, filtering processes on said image data with said first and second filters and said plurality of filters to calculate the degrees of inclination agreement between the filters and said image data for detecting the inclination angle of said image.

5. The image processing device according to claim 1, wherein
said detector further includes a calculating portion which calculates the degrees of agreement between the inclination angles exhibited by the filters and the inclination angle of the image, on the basis of the image data obtained from said first and second processors, and
said detector detects the inclination angle of said image, on the basis of the degrees of agreement calculated by said calculating portion.

6. The image processing device according to claim 1, wherein
after said detector detects the inclination angle of said image, the inclination angle of said image is detected with filters capable of detecting the inclination angle with higher accuracy.

7. The image processing device according to claim 6, wherein
the interval between dots on a basic filter, out of said filters capable of detecting the inclination angle with higher accuracy, is an integral multiple of the interval between said dots put on said printed object and said integral multiple is more than twice.

8. The image processing device according to claim 1, wherein
said first and second filters are filters for determining whether or not the positional relationship among dots at least in two directions is a predetermined positional relationship.

9. The image processing device according to claim 1, further comprising:
a corrector which corrects the inclination of said image data, on the basis of said detected inclination angle.

10. The image processing device according to claim 1, wherein
said printed object has a dot put thereon for enabling detection of the orientation of said printed object, and
said dot for enabling the detection of the orientation is detected with filters to detect the orientation of said image.

11. The image processing device according to claim 10, further comprising:
a rotating portion which rotates said image, on the basis of said detected orientation of the image.

12. The image processing device according to claim 1, further comprising:
a third processor which processes said input image data with a third filter for detecting inclination agreement between said dots on the printed object and dots which are included in the third filter and arranged at a third inclination angle and at the predetermined interval, wherein
said detector uses said first to third filters to calculate the degrees of inclination agreement between the respective filters and the image data and determines which of the filters defines an inclination angle close to the inclination angle of said image, on the basis of the respective degrees of inclination agreement.

13. An image processing method performed in an electronic image processing apparatus of the type including an interface for receiving image data, a processor, and a storage device, said method comprising:
an inputting step of inputting, into said electronic image processing apparatus via said interface, image data obtained by reading a printed object having dots put thereon at least in a single direction at a predetermined interval;
a first processing step of processing, with said processor of said electronic image processing apparatus, said image data with a first filter for detecting inclination agreement between dots included in the first filter and the dots on the printed object, said dots included in the first filter being arranged at a first inclination angle and at the predetermined interval;
a second processing step of processing, with said processor of said electronic image processing apparatus, said image data with a second filter for detecting inclination agreement between dots included in the second filter and the dots on the printed object, said dots included in the second filter being arranged at a second inclination angle and at the predetermined interval; and
a detecting step of detecting, with said processor of said electronic image processing apparatus, an inclination angle of said image data, on the basis of an output obtained by said first and second processing steps.

14. The image processing method according to claim 13, wherein
said first and second filters are filters for determining whether or not the positional relationship between at least two dots is a predetermined positional relationship.

15. The image processing method according to claim 13, wherein said detecting step performs, in order, an evaluation processes on said image data with a plurality of filters, the dots included on the filters being inclined at different angles, and said first and second filters to calculate the degrees of inclination agreement between the filters and said image data for detecting the inclination angle of said image.

16. An image processing device comprising:
an input interface which is configured to receive image data obtained by reading a printed object having dots put thereon at a predetermined interval; and
a processor which is configured to process said received image data with a first filter for detecting an inclination agreement between said dots on the printed object and dots which are included in the first filter and are arranged at a first inclination angle and at the predetermined interval,
said processor being further configured to process said received image data with a second filter for detecting an inclination agreement between said dots on the printed object and dots which are included in the second filter and are arranged at a second inclination angle being different from the first inclination angle and at the predetermined interval; and
said processor being further configured to detect the inclination angle of said image data, on the basis of an output from the processing of said received image data with said first and second filters.

\* \* \* \* \*

UNITED STATES PATENT AND TRADEMARK OFFICE
CERTIFICATE OF CORRECTION

| | | |
|---|---|---|
| PATENT NO. | : 7,925,115 B2 | Page 1 of 1 |
| APPLICATION NO. | : 11/350060 | |
| DATED | : April 12, 2011 | |
| INVENTOR(S) | : Motohiro Asano | |

It is certified that error appears in the above-identified patent and that said Letters Patent is hereby corrected as shown below:

Column 12:
Line 62, claim 4, delete "in order,. filtering" and insert -- in order, filtering --.

Signed and Sealed this
Thirty-first Day of May, 2011

David J. Kappos
*Director of the United States Patent and Trademark Office*

UNITED STATES PATENT AND TRADEMARK OFFICE
CERTIFICATE OF CORRECTION

PATENT NO.        : 7,925,115 B2
APPLICATION NO.   : 11/350060
DATED             : April 12, 2011
INVENTOR(S)       : Motohiro Asano Page 1 of 1

It is certified that error appears in the above-identified patent and that said Letters Patent is hereby corrected as shown below:

This certificate supersedes the Certificate of Correction issued May 31, 2011. The certificate is vacated since alleged error does not exist in printed patent. The Certificate of Correction should not have been issued.

Signed and Sealed this
Eighth Day of November, 2011

David J. Kappos
*Director of the United States Patent and Trademark Office*